(12) United States Patent
Rangarajan et al.

(10) Patent No.: US 9,781,542 B2
(45) Date of Patent: Oct. 3, 2017

(54) TECHNIQUES FOR PREDICTIVE POWER MANAGEMENT OF A MOBILE DEVICE

(71) Applicant: Facebook, Inc., Menlo Park, CA (US)

(72) Inventors: Kumar Rangarajan, Menlo Park, CA (US); Giridhar Sreenivasa Murthy, Menlo Park, CA (US); Veera Venkata Naga Rama Kandula, Cupertino, CA (US); Naga Venkata Surya Maruthi Lakshman Kakkirala, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 123 days.

(21) Appl. No.: 14/550,007

(22) Filed: Nov. 21, 2014

(65) Prior Publication Data

US 2016/0150072 A1 May 26, 2016

(51) Int. Cl.
*H04B 1/38* (2015.01)
*H04W 4/00* (2009.01)
*H04W 52/02* (2009.01)
*H04M 1/725* (2006.01)

(52) U.S. Cl.
CPC ....... *H04W 4/003* (2013.01); *H04W 52/0254* (2013.01); *H04W 52/0258* (2013.01); *H04W 52/0277* (2013.01); *H04M 1/72569* (2013.01); *Y02B 60/50* (2013.01)

(58) Field of Classification Search
CPC .............................. H04M 1/73; H04W 4/003
See application file for complete search history.

(56) References Cited

U.S. PATENT DOCUMENTS

| | | | |
|---|---|---|---|
| 8,655,307 B1* | 2/2014 | Walker | H04W 52/0212 455/343.5 |
| 2010/0151918 A1* | 6/2010 | Annambhotla | G01R 31/3648 455/573 |
| 2011/0282508 A1* | 11/2011 | Goutard | H04L 63/20 700/293 |
| 2012/0210325 A1* | 8/2012 | de Lind van Wijngaarden | H04W 52/0258 718/103 |
| 2013/0103960 A1* | 4/2013 | Alberth | G06F 1/3212 713/320 |
| 2013/0109443 A1* | 5/2013 | Eaton | H04W 52/0248 455/572 |

* cited by examiner

*Primary Examiner* — Keith Fang

(57) ABSTRACT

Techniques for managing discussion sharing on a mobile platform, comprising a power application. The power application may include, among other components, a power monitoring component to monitor at least one component and/or at least one application of a mobile device to determine device profile information, and a power management component to provide the determined device profile information of a mobile device to a server device and receive predicted information representative of forecasted power utilization of the mobile device and/or context sensitive recommendation information representative of one or more context sensitive recommendations for the mobile device.

20 Claims, 13 Drawing Sheets

TECHNIQUES FOR PREDICTIVE POWER MANAGEMENT OF A MOBILE DEVICE

BACKGROUND

A mobile device, such as a mobile smart phone, provides their users with a multimedia content rich experience while away from home and improves their users' daily productivity and efficiency while at work. However, many mobile devices have a limited battery life and charging the mobile devices when battery is low may be inconvenient and/or may even be impossible. With increased use of mobile devices and increased dependency of the mobile devices by their users, there is a need for a better management of battery life on mobile devices.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for managing discussion sharing on a mobile platform. Some embodiments are particularly directed to techniques for managing discussion sharing between and among one or more power applications on one or more mobile devices. In one embodiment, for example, an apparatus may include a processor circuit, and memory operatively coupled to the processor circuit. The memory may store the mobile power application for execution by the processor circuit, where the mobile power application may include, among other components, a power monitoring component to monitor at least one component and/or at least one application of a mobile device to determine device profile information, and a power management component to provide the determined device profile information of a mobile device to a server device and receive predicted information representative of forecasted power utilization of the mobile device and/or context sensitive recommendation information representative of one or more context sensitive recommendations for the mobile device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1A:
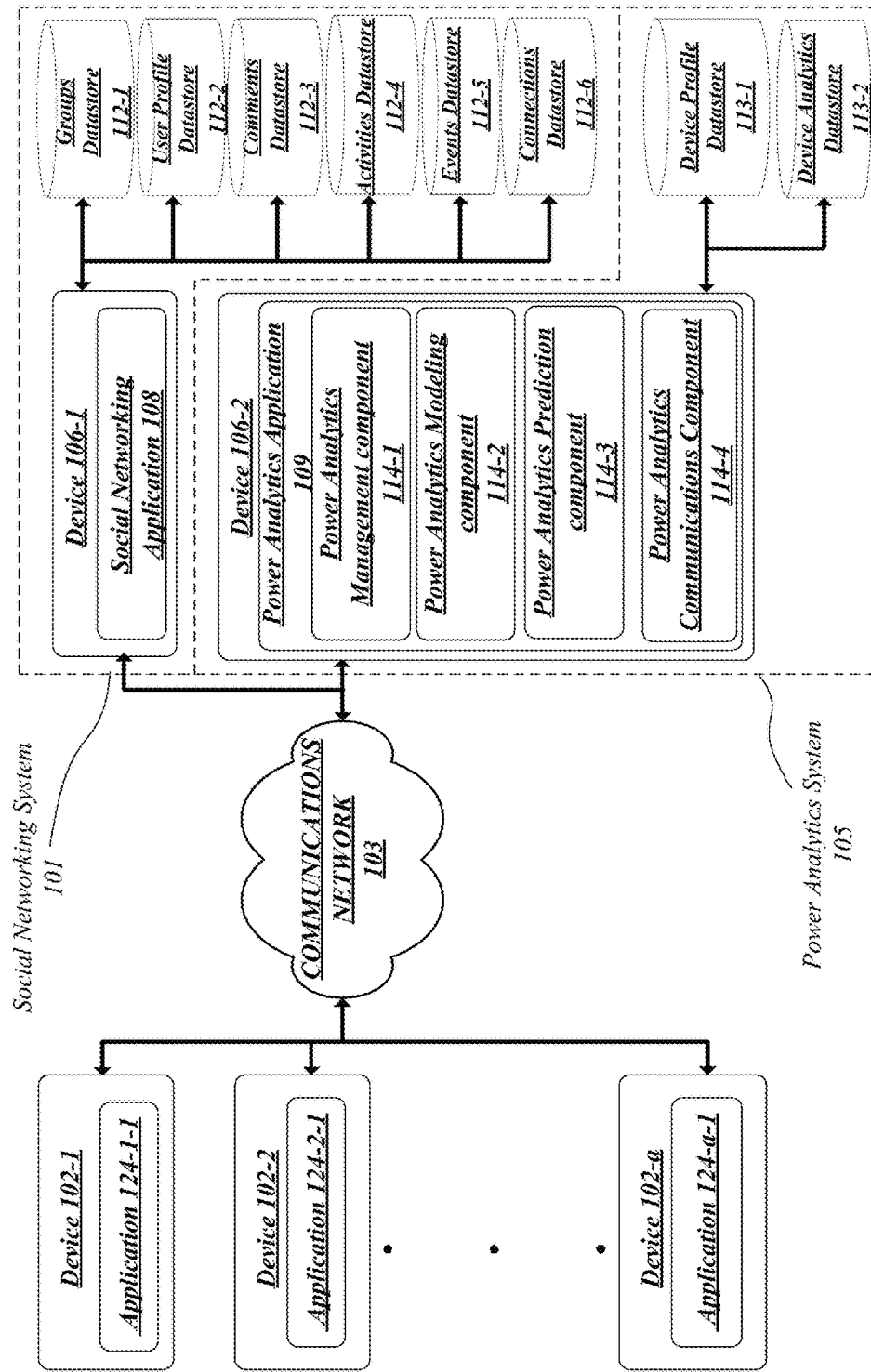
FIG. 1A illustrates an exemplary embodiment of a predictive power management system.

Various embodiments are generally directed to a mobile power management system to provide predictive power management and context sensitive recommendations for one or more devices (e.g., one or more mobile devices, etc.) having a finite capacity of reserved power (e.g., battery power, etc.) before requiring to replenish the power reserve (e.g., charge the mobile device, etc.). Typically, most device power management systems provide an estimated run time based substantially on current or instantaneous power use of a device, and typically do not take into consideration of aggregate usage patterns of the devices by their users. By aggregating usage patterns of the devices, the predictive power management system may provide context sensitive recommendations for the user and/or mobile device to, terminate, configure, and/or modify one or more components and/or applications of the device in order to increase the power reserve of the mobile device.

To achieve these goals and other improvements, the power application executing on the mobile device may be generally arranged to capture, store, and/or provide, periodically, the device profile information representative of power utilization and usage patterns of one or more applications and/or components of the mobile device, such as, for example, one or more applications executing in foreground, background, and/or suspended state, one or more components such as the processing component (central processing unit, graphics processing unit, etc.), storage component (e.g., flash memory, hard disks, etc.), system memory (e.g., random access memory, etc.), communications component (e.g., Wi-Fi, Bluetooth, Cellular, etc.), touch sensitive display component (e.g., display screen, etc.), location component (e.g., global positioning system etc.), acceleration component (e.g., accelerometer, etc.), audio input/output component (e.g., speakers, microphones etc.). Additionally, the power application may also be generally arranged to capture and/or store, periodically calendar events associated with the calendar application of mobile device as part of the device profile information. Optionally, the power application may also be arranged to capture and/or store at least a portion of the user profile information (e.g., social events and demographic information, etc.) associated with a social networking system. To reduce power utilization of the mobile power application in predicting power utilization, the device profile information and/or the user profile information may be provided, periodically, to a power analytics application which may be implemented on a server device as part of a cloud computing platform.

Based at least partially on the captured and/or stored device profile information and optionally, the user profile information captured and/or stored, the power analytics application may generate past context information representative of past activities or past contexts that the user of the mobile device and/or the mobile device itself may have performed in the past. The power analytics application may also determine past application context information during each of the past activities or past contexts representative of the applications that were executed during those past activities or past contexts. The power analytics application may further determine past power curve information representative of past power utilization during the one or more past activities or past contexts.

Based at least partially on the device profile information, the past context information, past power curve information, and/or the user profile information for a recurring day of the week (e.g., every Monday in the past 12 weeks, every Tuesday in the past 4 weeks, etc.), the power analytics application, utilizing machine learning techniques, may determine analytics context information representative of estimated or forecasted activities or analytics contexts (e.g., meetings, traveling, work, home, etc.) for that recurring day of the week (e.g., Mondays, etc.) that the user of the mobile device and/or the mobile device itself may perform. The power analytics application may also determine analytics application context information during each of the estimated or forecasted activities or analytics contexts representative of the applications that are likely to be executed during the estimated or forecasted activities or analytics contexts. The power analytics application may further determine the estimated or forecasted power utilization during each of the estimated or forecasted activities or analytics contexts for a reoccurring day of the week (e.g., Monday, Tuesday, etc.).

Based at least partially on the device profile information (e.g., calendar events, etc.) and/or user profile information, the power analytics application may determine future context information representative of one or more scheduled, planned, or otherwise anticipated activities or future contexts. The power analytics application may also determine future application context information during each of the scheduled, planned, or otherwise anticipated activities or future contexts representative of the applications that are likely to be executed during those scheduled, planned, or otherwise anticipated activities or future contexts. The power analytics application may also determine future power curve information representative of an estimated or anticipated power utilization during those activities scheduled, planned, or otherwise anticipated activities.

Based at least partially on the future context information, future power curve information, future application context information, past context information, past power curve information, past application context information, analytics power curve information, analytics context information, and/or analytics application context information, the power analytics application may determine predicted context information representative of the past activities or past contexts that has already been performed, the future activates or contexts that will be performed, and/or the estimated or forecasted activities or analytics contexts that is likely to be performed on a reoccurring day of the week (e.g., a Monday, etc.). The power analytics application may also determine predicted power curve information representative of the power utilization for each of the contexts represented by predicted context information. Based at least partially on the predicted context information and predicted power curve information, the power analytics application may further determine predicted power event information which may provide the estimated time the battery of the mobile device may fall below a predetermined threshold level (e.g., less than 5% power remaining, etc.) and estimated or forecasted time the user typically charges the mobile device.

Based at least partially on the predicted power event information and predicted context information, power analytics application may further determine that based on the past power utilization represented by past power curve information, the scheduled, planned or anticipated power utilization, and/or estimated or forecasted power utilization, mobile device may be unable to be utilized for one or more the scheduled, planned or anticipated activities and/or estimated or forecasted activities (e.g., recording audio for meetings, providing GPS navigation during traveling, sending and/or receiving emails while at work, etc.). As such, based at least partially on the predicted power event information, the predicted context information, and/or predicted power curve information, the power analytics application may generate one or more context sensitive recommendations represented by context sensitive recommendation information for one or more activities or contexts to reduce power utilization while retaining at least some functionality of the mobile device during the one or more activities or contexts.

It may be appreciated that because the predicted power curve information and/or predicted context information are determined based on power utilization and activities or contexts accrued for several reoccurring days of the week (e.g., one or more Mondays for 12 weeks, etc.), the predicted power utilization may adapt over time to a mobile device's power utilization patterns for one or more recurring day of the week (e.g., Monday, Tuesday, etc.) and provide context sensitive recommendations that take into consideration expected power utilization (e.g., expected execution of one or more applications on the mobile device throughout a reoccurring day of the week).

As a result of these improvements discussed above and elsewhere, the user's experiences and expectations of power utilization on a mobile device may be greatly improved.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the needed purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1A illustrates an exemplary embodiment of a predictive power management system 100. In various embodiments, the predictive power management system 100 may comprise a social networking system 101 (e.g., Facebook®, Google+®, LinkedIn®, etc.), a power analytics system 105, and one or more devices 102-$a$ (e.g., server devices, devices, computing devices, networking devices, etc.). In some embodiments, the one or more devices 102-$a$ may provide power analytics services to enable various users (e.g., persons, businesses, hardware/software components, computing devices, etc.) and/or their devices to manage power utilization based at least partially on one or more context sensitive recommendations. In some embodiments, the one or more devices 102-$a$ may also provide social networking services to enable various users to communicate and interact between and among each other. To provide the power analytics services and/or social networking services to various users, the one or more devices 102-$a$ associated with various users may also be operatively coupled to the social networking system 101 via communications network 103 (e.g., internet, intranet, cellular network, etc.) utilizing various communications mediums (e.g., wired, wireless, fiber optic, etc.) and/or communications standards (e.g., Ethernet IEEE 802.3, Wireless IEEE 802.11, WiMAX IEEE 802.16, Global Systems for Mobile Communications (GSM), Enhanced Data Rates for GSM Evolution (EDGE), Long Term Evolution (LTE), etc.).

It is worthy to note that "a" and "b" and "c" and similar designators as used herein are intended to be variables representing any positive integer. Thus, for example, if an implementation sets a value for a=2, then a complete set of devices 102-$a$ may include devices 102-1 and 102-2. Similarly, if an implementation sets value for a=2, then a complete set of applications 124-$a$-1 may include applications 124-1-1 and 124-2-1. Furthermore, if an implementation sets value for b=7, then a complete set of applications 124-1-$b$ may include applications 124-1-1, 124-1-2, 124-1-3, 124-1-4, 124-1-5, 124-1-6, and 124-1-7. The embodiments are not limited in this context.

To utilize the power analytics services provided by the power analytics system 105, each device of the one or more devices 102-$a$ may be configured to execute at least applications 124-$a$-1. The applications 124-$a$-1 may be configured to communicate with the power analytics system 105 and/or social networking system 101 via communications network 103 to provide the power analytics services to the users. To enable the power analytics system 105 to provide aggregate context sensitive recommendations, each user of applications 124-$a$-1 may also be associated with a user account in the social networking system 101. Each user account may be represented by user account information. The user account information for each user may include, but is not limited to, user account identifier (e.g., phone number, e-mail address, etc.), user account authentication token (e.g., user account password, physical and/or virtual security tokens, etc.), and/or any other information relevant to the authentication and authorization of each user. To ensure authorized access of each user, the social networking system 101 may be further configured to authenticate each user based on at least a portion of the user account information (e.g., user account identifier, user account authentication token, etc.) provide by each user and received from one or more devices 102-$a$. Once a user having the associated user account has been successfully authenticated, the social networking system 101 may provide one or more applications (e.g., application 124-1-1, etc.) with one or more time limited access tokens having a set of access permissions associated with the user account of the user to retrieve, store, modify, update, and/or otherwise access information within a specific time period in the social networking system 101 utilizing the application.

Each user account may be further associated with a user profile representative of a user's presence within the social networking system 101. Each user profile associated with each user may be represented by user profile information, which may include, but is not limited to, user identifier information (e.g., a unique identifier that identifies the user and the user profile information), user biographic and/or demographic information, (e.g., user name information which may include, but is not limited to, a first, middle, and/or last name of the user, an entity name associated with the user, contact information of the user, birth date of the user), user profile media information (e.g., profile image(s) of the user, a focused user profile image of the user, etc.), user location information (e.g., the hometown location of the user, the current location of the user, the work location(s) of the user, etc.), user time zone information (e.g., time zone of the user, etc.), user social connections information (e.g., a list of friends, family members, coworkers, teammates, classmates, business associates, of the user), user groups membership information, user forums membership information, user interest information (e.g., the interests listed by the user, movies listed by the user, music listed by the user, books listed by the user, approvals or "likes" of the user, or any other information that may identify the user's interest), user employment history information (e.g., list of current and/or past employers of the user), user social message information (e.g., one or more social networking messages where the user is a recipient), user event information (e.g., one or more social events associated with the user, etc.), user profile discussion information (e.g., one or more profile activities, such as, profile posts in the user profile), user group search information (e.g., one or more group search queries inputted by the user) and/or any other preference/personal information associated with the user.

Figure 1B:
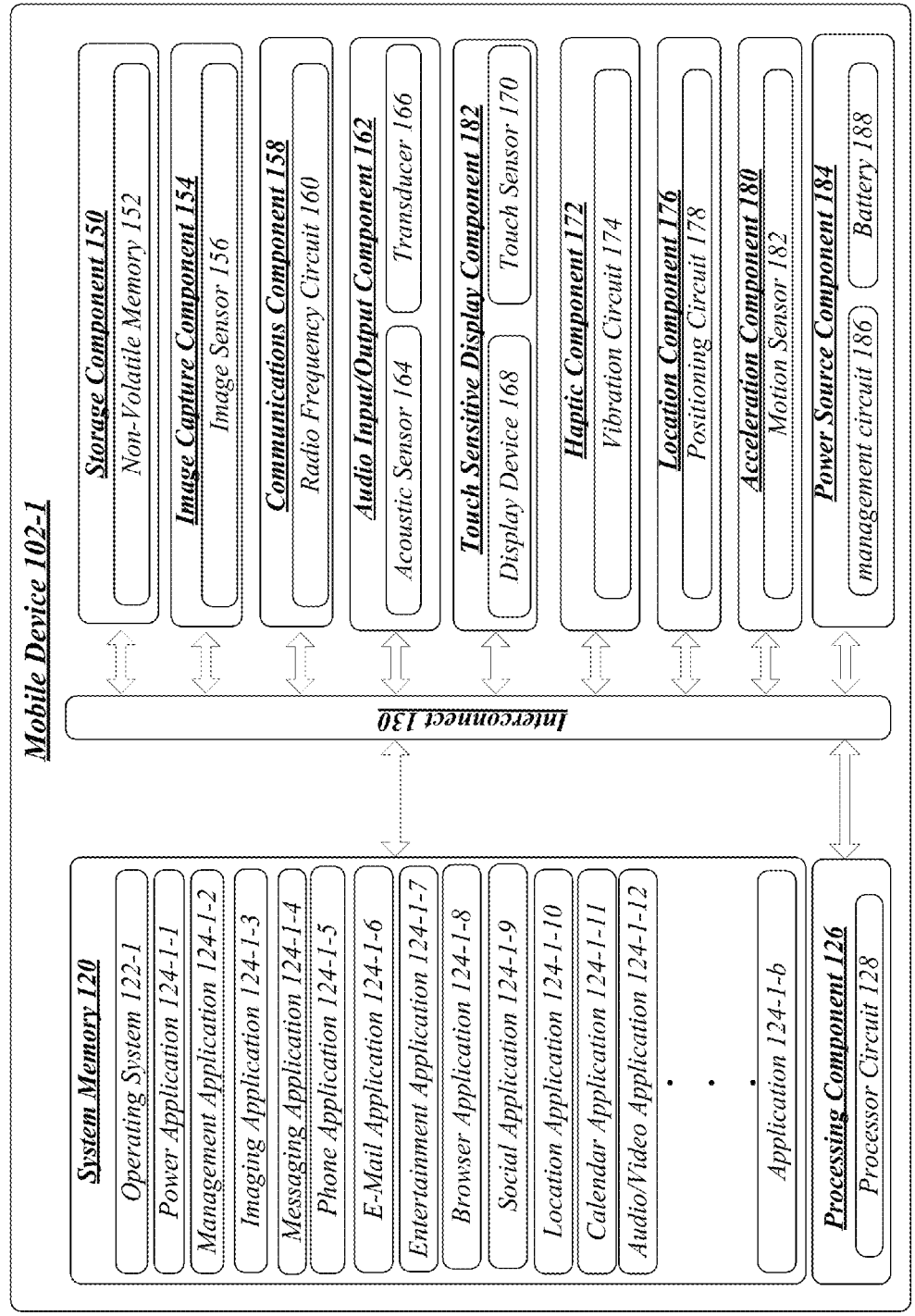
FIG. 1B illustrates an exemplary embodiment of a device, which may be a mobile device, comprising one or more applications.

In some embodiments, the social networking system 101 may enable one or more applications (e.g., social application 124-1-9 further discussed with respect to FIG. 1B, etc.) of device 102-*a* to retrieve at least a portion of the user profile information associated with the user and display at least a portion of the user profile information on one or more display screens operatively coupled to the devices 102-*a*. To facilitate user interaction between and among users in the social networking system 101, the social networking system 101 may also enable users to search user profile of other users based at least partially on a received search query and at least a portion of the user profile information associated with other users, retrieve at least a portion of the user profile information of the other users, and form one or more social connections with other users by enabling users via the one or more applications of devices 102-*a* to identify other users as the user's friend, family member (e.g., spouse, cousin, mother, father, grandmother, grandfather, brother, sisters, daughter, son, etc.), coworker, teammate, classmate, business associate, or any other social relationship.

It may be appreciated that the social connections formed between a pair of users may be unidirectional, when only one user in the pair of users identifies and acknowledges the type and existence of social relationship. Alternatively, the social connections formed between the pair of users may be bidirectional when both users in the pair of users identify the same type of social relationship and the existence of social relationship. As such, the social networking system 101 further receive, provide, and/or update user social connections information which may include, but is not limited to, a list of social connection information representative of the social connections of the user (e.g., the user identifier information or other resource or social networking object the user is connected to) and the social connection type information representative of a social connection type (e.g., friend, family member, coworker, teammate, classmate, business associate, and/or any other social relationship) associated with each social connection. Based on the user social connections information of a plurality users, the social networking system 101 may be further configured to determine social proximity information which may include, but is not limited to, the degree of separation between one or more pairs of users.

In some embodiments, the social networking system 101 may further enable users to create, publish, or post one or more profile activities (e.g., posts, polls, Universal Resource Identifier/Universal Resource Locator (URI/URL) references, etc.), or any other information on the user's own user profile represented by the user profile information. Additionally, in some embodiments, the social networking system 101 may further enable some users to create, publish, post one or more profile activities on user profiles of other users based at least partially on the user social connection information of the other users. The social networking system 101 may also enable users to send and/or receive private social messages to one or more users by communicating the social message information comprising one or more private social messages to and from one or more users.

To provide collaboration and between and among a specific set of users, including between and among users that may not have a social connection with other users in the specific set of users, the social networking system 101 may further enable the association and/or management of one or more groups and/or one or more forums. In some embodiments, each group may be represented by social group information, which may include, but is not limited to, group identifier information (e.g., a unique identifier that identifies a particular group in the social networking system 101), group privacy information (e.g., group privacy type for the particular group which may include, but is not limited to, secret group type, open group type, or closed group type), group cover image information, group description information (e.g., a description associated with the particular group), group name information (e.g., the group name of the particular group), group owner information (e.g., the owner of the particular group), group location information (e.g., the location of the particular group), group membership information (e.g., a list of group members in the particular group), group membership count information (e.g., a total number of group members in the particular group), or any other information associated with one or more groups.

In some embodiments, the social networking system 101 may enable users to create one or more groups in the social networking system 101 utilizing the one or more applications 124-*a*-1. Moreover, the social networking system 101 may enable users to create one or more groups by receiving at least a portion of the social group information (e.g., group privacy information, group cover image information, group description information, group name information, group owner information, group membership information), and creating a group based at least partially on the received social group information.

In some embodiments, the social networking system 101 may also enable users to search for one or more groups and/or one or more forums in the social networking system 101 utilizing the one or more applications 124-*a*-1. Moreover, the social networking system 101 may enable users to input one or more search queries utilizing the one or more applications 124-*a*-1 and providing one or more search results to the one or more applications 124-*a*-1 based at least partially on the one or more received search queries. In other embodiments, the search of one or more groups and/or forums may be limited.

To provide users with these and other social networking services, the social networking system 101 may comprise server device 106-1 which may include, among other applications, social networking application 108. The social networking system 101 may further comprise one or more datastores 112-*d* operatively coupled to the server device 106. The one or more datastores 112-*d* may be configured to store one or more resources or social networking objects representative of the information received and provided by the social networking system 101. Moreover, the social networking objects of the social networking system 101 may include, but is not limited to, one or more groups which may be stored in the groups datastore 112-1, one or more user profiles which may be stored in the user profiles datastore 112-2, one or more comments which may be stored in the comments datastore 112-3, one or more activities (e.g., posts, polls, threads, etc.) which may be stored in the activities datastore 112-4, one or more events which may be stored in events datastore 112-5 (e.g., social events organized between and among one or more users, etc.), or any other social networking object that may be received, stored, provided, or otherwise tracked and/or accessed by the social networking system 101 to provide the users with these and other social networking services.

The one or more datastores 112-*d* may further store object connections between two or more objects or resources in the object connections datastore 112-6. Moreover, the object connections may be representative of the relationship or links between the two or more objects. The one or more social networking objects in conjunction with one or more objects connections may form a social graph comprising two or more nodes interconnected via one or more edges, where each node may be representative of a social networking object and each edge may be representative of the object connections between two or more social networking objects in the social networking system 101. To enable the applications 124-a-1 to retrieve, modify, update or otherwise access the various information managed by the social networking system 101 and represented as the social graph, the social networking application 108 may further provide a graph application program interface (API) utilizing various protocols (e.g., HTTP, HTTPs, etc.).

In some embodiments, the social networking application 108 may include one or more social networking components (not shown). At least some of the one or more social networking components 110-c may be arranged to implement at least a portion of the graph API. The one or more social networking components may be generally arranged to enable association and management of one or more groups by one or more users, enable association and management of one or more user profiles and/or user accounts by one or more users, enable association and management of one or more forums by one or more users, generate one or more notifications based at least partially on one or more users' activity in the social networking system 101, provide the one or more notifications to one or more applications of devices 102-a to notify one or more users, search for information in the social networking system 101 in response to one or more search queries received from one or more user, and provide search results to one or more users via the one or more applications 124-a-1. The social networking application 108 may further be generally arranged to communicate with the one or more applications of 102-a via communications network 103.

To provide users with power analytics services, the power analytics system 105 may include server device 106-2 which may include, among other applications, power analytics application 109. The power analytics system 105 may further include one or more datastores 113-e operatively coupled to the server device 106-2. The one or more datastores 113-e may be configured to store information associated with the power analytics system 105.

In some embodiments, the one or more datastores 113-e may include, but is not limited to, a device profile datastore 113-1, to store device profile information associated with the power analytics system 105 for at least one device of the one or more devices 102-a. The device profile information for at least one device may include, but is not limited to, device application information (e.g., information regarding the applications that are executed on the devices and each application's component utilizations of the device, etc.), device component information (e.g., the total utilization for each component of the device by all applications, etc.), device event information (e.g., events generated by the devices 102-a, events inputted by the user, such as, events in a calendar application of the device, device location information (e.g., the physical locations associated with the device, etc.), or any other information for providing power analytics services. Additionally, to enable aggregate context sensitive recommendations, the device profile datastore 113-1 may also store at least a portion of the user profile information (e.g., user identifier information, user location information, user social connections information, user event information, etc.) of social networking system 101.

In some embodiments, the one or more datastores 113-e may further include, but is not limited to, a device analytics datastore 113-2 for at least one device of the one or more devices 102-a. The device analytics datastore 113-2 may be configured to store device analytics information associated with the power analytics system 105 for at least one device of the one or more devices 102-a. The analytics information for at least one device may include, but is not limited to, analytics model information (e.g., one or more generated or determined models for a device for a set time period that predicts or forecasts power utilization of the device during the set time period, etc.), the analytics context information (e.g., typical events, meetings, appointments, locations, or any other activity during the set time period, etc.), the analytics power curve information (e.g., information to construct an analytics power curve such as a power reserve versus time curve representative of typical power utilization of the device within the set time period, etc.), or any other information that may assist the user of the one or more devices 102-a and/or modify the one or more devices 102-a to improve power utilization.

The power analytics application 109 may include, but is not limited to, one or more components 114-f. The one or more components may include, but is not limited to, power analytics management component 114-1 generally arranged to manage the analysis of device profile information and/or user profile information received from one or more devices 102-a and provide the analytics information, prediction information, and/or recommendation to the one or more devices 102-a. The one or more components may further include, but is not limited to, power analytics modeling component 114-2 generally arranged to generate analytics information based at least partially on the receive device profile information for one or more devices 102-a and/or at least a portion of user profile information. The one or more components may also include, but is not limited to, power analytics prediction component 114-3 generally arranged generate predicted information and/or recommendation information based at least partially on the generated analytics information.

FIG. 1B illustrates an exemplary embodiment of a device 102-1, which may be a mobile device 102-1 (e.g., a mobile phone or any other a portable computing and/or communications device), comprising one or more applications 124-1-b, in the mobile predictive power management system 100. The mobile device 102-1 may be generally arranged to provide mobile computing and/or mobile communications and may include, but is not limited to, system memory 120, processing component 126, storage component 150, image capture component 154, communications component 158, acoustic input/output component 162, touch sensitive display component 182, haptic component 172, location component 172, acceleration component 180 and power source component 184, where each of the components and system memory 120 may be operatively connected via interconnect 130.

In some embodiments, the processor component 126 may be generally arranged to execute instruction information including one or more instructions. In some embodiments, the processor component 126 may be a mobile processor component or system-on-chip (SoC) processor component which may comprise, among other elements, processor circuit 128. The processor circuit 128 may include, but is not limited to, a central processor unit (CPU) comprising a first set of electronic circuits arranged to execute one or more instructions and/or a graphics processing unit (GPU) comprising a second set of electronic circuits arranged to execute one or more graphics-oriented instructions. Exemplary processor components 126 may include, but is not limited to, Qualcomm® Snapdragon®, Nvidia® Tegra®, Intel® Atom®, Samsung® Exynos, Apple® A7®, Apple® A8®, or any other type of mobile processing component 126 arranged to execute the instruction information including the one or more instructions stored in system memory 120 and/or storage component 150.

In some embodiments, the storage component 150 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In some embodiments, the image capture component 154 may be generally arranged to capture one or more images or a sequence of one or more images (e.g., video, etc.) and provide image information and/or video information. The image capture component 154 may include, among other elements, image sensor 156. Exemplary image sensors 156 may include, but is not limited to, charged-coupled devices (CCD), active-pixel sensors (APS), or any other type of image sensors arranged for converting optical images into electronic signals that may be compressed, encoded, and/or stored as image information and/or video information.

In some embodiments, the communications component 158 may be generally arranged to enable the mobile device 102-1 to communicate with the social networking system 101 via the communication network 103. The communications component 158 may include, among other elements, a radio frequency circuit 160 configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), etc.).

In some embodiments, the acoustic input/output (I/O) component 162 may be generally arranged for converting sound, vibrations, or any other mechanical waves received into electronic signals representative of acoustic input information utilizing an acoustic sensor 164 (e.g., a microphone, etc.). Additionally, the acoustic I/O component 162 may be further arranged to convert electronic signals representative of acoustic output information utilizing an electroacoustic transducer 166 (e.g., a speaker, etc.) to output sound, vibrations, or any other mechanical waves.

In some embodiments, the touch sensitive display component 182 may be generally arranged to receive and present visual display information, and provide touch input information based on detected touch based or contact based input. Moreover, the touch sensitive display component 182 may include, among other elements, a display device 168 (e.g., liquid-crystal display, light-emitting diode display, organic light-emitting diode display, etc.) for presenting the visual display information and touch sensor 170 (e.g., resistive touch sensor, capacitive touch sensor, etc.) associated with the display device 168 to detect and/or receive touch or contact based input information via associated with the display device 168. Additionally, in some embodiments, the touch sensor 170 may be integrated with the surface of the display device 168, so that a user's touch or contact input may substantially correspond to the presented visual display information on the display device 168.

In some embodiments, the haptic component 172 may be generally arranged to provide tactile feedback through the housing, case, or enclosure of the mobile device 102-1. Moreover, the haptic component 172 may include, among other elements, a vibration circuit 174 (e.g., an oscillating motor, vibrating motor, etc.) arranged to convert haptic information to mechanical vibrations representative of tactile feedback.

In some embodiments, the location component 176 may be generally arranged to receive positioning signals representative of positioning information and provide location information (e.g., approximate physical location of the current mobile device 102-1) based at least partially on the received positioning information. Moreover, the location component 176 may include, among other elements, a positioning circuit 178 (e.g., a global positioning system (GPS) receiver, etc.) arranged to determine the physical location of the mobile device 102-1. In some embodiments, the location component 176 may be further arranged to communicate and/or interface with the communications component 158 and communicate with the communications network 103 in order to provide greater accuracy and/or faster location acquisition of the location information.

In some embodiments, the acceleration component 180 may be generally arranged to detect acceleration of the mobile device 102-1 in one or more axes. The acceleration component 180 may include, among other elements, motion sensor 182 (e.g., accelerometer, etc.) to convert physical motions applied the mobile device 102-1 into motion information.

In some embodiments, the power source component 184 may be generally arranged to provide electrical power to the system memory 120 and/or one or more components of the mobile device 102-1. The power source component 184 may include, among other elements, battery 188 (e.g., a group of cells for storing and providing electrical energy, etc.) and management circuit 186 for providing power source information (e.g., current charge rate and/or discharge rate of the battery 188, the design capacity of the battery 188, the current capacity of the battery 188, remaining capacity of the battery 188, etc.).

In some embodiments, the system memory 120 may be generally arranged to store information in volatile and/or nonvolatile high speed memory similar to those discussed with respect to storage component 150. In some embodiments, at least a portion of the stored information in the system memory 120 may comprise instruction information arranged for execution by the processing component 126. In those embodiments, the instruction information may be representative of at least one operating system 122-1, one or more applications 124-1-b, and/or any other programs and/or modules. In some embodiments, the one or more applications 124-1-b may include, but is not limited to, a management application 124-1-2 generally arranged to manage the execution of the one or more applications 124-1-b of the mobile device 102-1. The one or more applications 124-1-b may further include, but is not limited to, power application 124-1-1. The one or more applications 124-1-b may also include, but is not limited to, non-power applications, which may include, but is not limited to, management application 124-1-2, imaging application 124-1-3, messaging application 124-1-4, phone application 124-1-5, e-mail application 124-1-6, entertainment application 124-1-7, browser application 124-1-8, social application 124-1-9, location application 124-1-10, calendar application 124-1-11, audio/video application 124-1-12, or any other application that is not the power application 124-*a*-1.

In some embodiments, the operating system 122-1 may comprise a mobile operations system 122-1 (e.g., Apple®, iOS®, Google® Android®, HP® WebOS®, Microsoft® Windows Phone®, Microsoft® Windows®, etc.) general arranged to manage hardware resources (e.g., one or more components of the mobile device 102-1) and/or software resources (e.g., one or more applications 124-1-*b* of the mobile device 102-1). The operating system 122-1 may be further arranged to modify execution states associated with one or more applications 124-1-*b* based at least partially on information received from one or more components (e.g., touch sensitive display component 182, power source component 184, location component, audio I/O component 158, etc.) and/or one or more applications (e.g., management application 124-1-1, phone application 124-1-5, e-mail application 124-1-6, messaging application 124-1-4, social application 124-1-9, etc.).

In some embodiments, the operating system 122-1 may be arranged to modify execution states by transitioning the one or more applications 124-1-*b* between and among the one or more execution states. The one or more execution states may include, but is not limited to, foreground state, non-execution state, suspended state, and/or background state. In some embodiments, applications 124-1-*b* may be initially in the non-execution state where the instruction information associated with applications 124-1-*b* in the non-execution state are not executed by the processor component 126 nor scheduled for execution by the processor component 126.

In some embodiments, the operating system 122-1 may transition an application (e.g., power application 124-1-1) initially in the non-execution state to the foreground state, in response to receiving a request to execute or initiate the execution of the application previously in the non-execution state (e.g., launching the application). In some embodiments, the operating system 122-1 may transition the application in a non-execution state to the foreground state where the instruction information associated with the application is executed or scheduled for execution by the processor component 126 as one or more processes in order to provide mobile computing operations associated with the application to the one or more users. In some embodiments, the operating system 122-1 may be further arranged to retrieve at least a portion of the application that is to be executed from the storage component 150 and store at least a portion of instruction information associated with an application (e.g., management application 124-1-2, power application 124-1-1, imaging application 124-1-3, etc.) in system memory 120 so that processing component 126 may retrieve and execute the instruction information associated with the application from system memory 120 as one or more processes. It may be appreciated that when an application (e.g., power application 124-1-1) is in the foreground state, one or more UI views associated with the application in the foreground state may be at least partially visible on the display device 168 of the touch sensitive display component 182 in order to process information (e.g., input information, etc.) received from one or more components (e.g., touch sensor 170, etc.) of the mobile device 102-1 via one or more asynchronous and/or synchronous events.

In some embodiments, the operating system 122-1 may transition an application (e.g., power application 124-1-1) from the foreground state to the suspended state, in response to a request to launch a different application (e.g., transitioning the different application, such as, for example, browser application 124-1-8 from non-execution state to the foreground state), switch to a different application (e.g., transitioning the different application, such as, for example, browser application 124-1-8 from background state to the foreground state), or resume a different application (e.g., transitioning the different application, such as, for example, browser application 124-1-8 from suspended state to the foreground state).

In some embodiments, the operating system 122-1 may transition the application from the foreground state to the suspended state where the instruction information associated with the application may be temporarily stopped or prevented from further execution by the processor component 126 and the execution context information (e.g., the information stored in processor registers, at least a portion of the application allocated in system memory 120, etc.) may be saved to the system memory 120 and/or storage component 150. In some embodiments, the operating system 122-1 may continue to store at least a portion of the suspended application in system memory 120 so that the suspended application may continue to reside or remain in system memory 120 which may enable the application in the suspended state to be quickly resumed (e.g., transitioning the application from the suspended state to the foreground state).

In some embodiments, the operating system 122-1 may transition an application (e.g., power application 124-1-1) may transition from the foreground state to the suspended state, in response to a request to launch a different application (e.g., transitioning the different application, such as, for example, browser application 124-1-8 from non-execution state to the foreground state), switch to a different application (e.g., transitioning the different application, such as, for example, browser application 124-1-8 from background state to the foreground state), or resume a different application (e.g., transitioning the different application, such as, for example, browser application 124-1-8 from suspended state to the foreground state). In some embodiments, the operating system 122-1 may transition the application from the foreground state to the background state where a limited portion of the instruction information (e.g., instruction information associated with a background thread of the application, etc.) associated with the application is continued for further execution by the processor component 126 while the one or more UI views may not be visible or partially visible on the display device 168.

In some embodiments, the operating system 122-1 may transition an application (e.g., power application 124-1-1) from the foreground state to non-execution state, in response to a request to close, terminate, and/or kill the application or the complete execution of the instruction information associated with the application by the processing component 126. In some embodiments, the operating system 122-1 may transition the application in the foreground state to the non-execution state where the processing component 126 stops executing most if not all instruction information associated with the application. In some embodiments, the operating system 122-1 may also free (e.g., remove, purge, otherwise make available, etc.) at least a portion of the system memory 120 previously storing the instruction information and/or execution context information associated with the application transitioning to the non-execution state.

In some embodiments, the management application 124-1-2 may be visually presented as a home screen UI view (not shown) comprising a plurality of UI elements representative of applications 124-1-b and may be generally arranged to launch on startup of the mobile device 102-1 and operating system 122-1. Additionally, the management application 124-1-2 may be arranged to receive touch input information from the touch sensitive display component 182 in order to launch one or more applications 124-1-b. In some embodiments, the management application 124-1-2 may be arranged to request the operating system 122-1 to launch or initiate the execution of one or more applications 124-1-b of mobile device 102-1 based at least partially on the received input information (e.g., touch based input information received from touch sensor 170, etc.).

In some embodiments, the imaging application 124-1-3 may be generally arranged to receive, store, display and/or otherwise manage image information and/or video information via the image capture component 154. In some embodiments, the message application 124-1-4 may be generally arranged to receive, transmit, display, and/or otherwise manage one or more messages including multimedia messages (e.g., pictures, videos, audio, etc.) utilizing one or more cellular and/or internet messaging services via one or more components of the mobile device 102-1. In some embodiments, the phone application 124-1-5 may be generally arranged to receive, make, display, and/or otherwise manage one or more audio and/or video phone calls utilizing one or more cellular and/or internet phone services via one or more components of the mobile device 102-1. In some embodiments, the e-mail application 124-1-6 may be generally arranged to receive, compose, display, and/or otherwise manage one or more one or more e-mails messages utilizing one or more components of the mobile device 102-1. In some embodiments, the entertainment application 124-1-7 may be generally arranged to provide mobile entertainment such as, for example, a mobile video game utilizing the CPU and/or the GPU of the processing component 126. In some embodiments, the browser application 124-1-8 may be generally arranged to access one or more web pages utilizing one or more utilizing one or more components of the mobile device 102-1. In some embodiments, the social application 124-1-9 may be generally arranged to provide social networking services between and among one or more users of one or more devices (e.g., Twitter®, Vine®, Facebook®, Reddit®, Digg®, Imgur®, etc.). In some embodiments, the location application 124-1-10 may be generally arranged to provide location and/or direction services and visually present the current location and/or directions to a location on a global and/or regional map. In some embodiments, the calendar application 124-1-11 may be generally arranged to store one or more appointments, meetings, and/or reminders, for a user of the mobile device 102-1. In some embodiments, the audio/video application 124-1-12 may be generally arranged to record, playback, or output audio and/or video information received via communications component 158 and/or stored in memory 120 and/or storage component 150.

In some embodiments, the power application 124-1-1 may be generally arranged to enable one or more users of the mobile device 102-1 to manage consumption of the mobile 102-1. In some embodiments, the power application 124-1-1 may be generally launched from the home screen UI view (not shown) of the management application 124-1-2 based at least partially on touched input information received from the touch sensitive display component 182. In some embodiments, the power application 124-1-1 may be configured to request access and/or obtain access to user profile information from social networking system 101.

Additionally or alternatively, in some embodiments, the power application 124-1-1 may be configured to enable mobile deep linking utilizing a deep link reference (e.g., a universal resource identifier (URI), universal resource locator (URL), etc.) associated with the power application 124-1-1. The deep link reference associated with the power application 124-1-1 may include, but is not limited to, application identification information (e.g., a unique identifier associated with the power application 124-1-1). In some embodiments, the deep link reference associated with the power application 124-1-1 may further optionally include, but is not limited to, application location information (e.g., an identifier associated with a specific location within power application 124-1-1, such as, group identifier information) configured to enable a non-power application (e.g., home screen UI view of the management application 124-1-2, imaging application 124-1-3, messaging application 124-1-3, phone application 124-1-5, e-mail-application 124-1-6, entertainment application 124-1-7, browser application 124-1-8, social application 124-1-9, or any other application 124-1-b that is not power application 124-a-1) to directly launch or transition to a specific location (e.g., one or more views identified by application location information) within the power application 124-1-1 from the non-power application based at least partially on touch input information received from the touch sensitive display component 182.

Figure 1C:
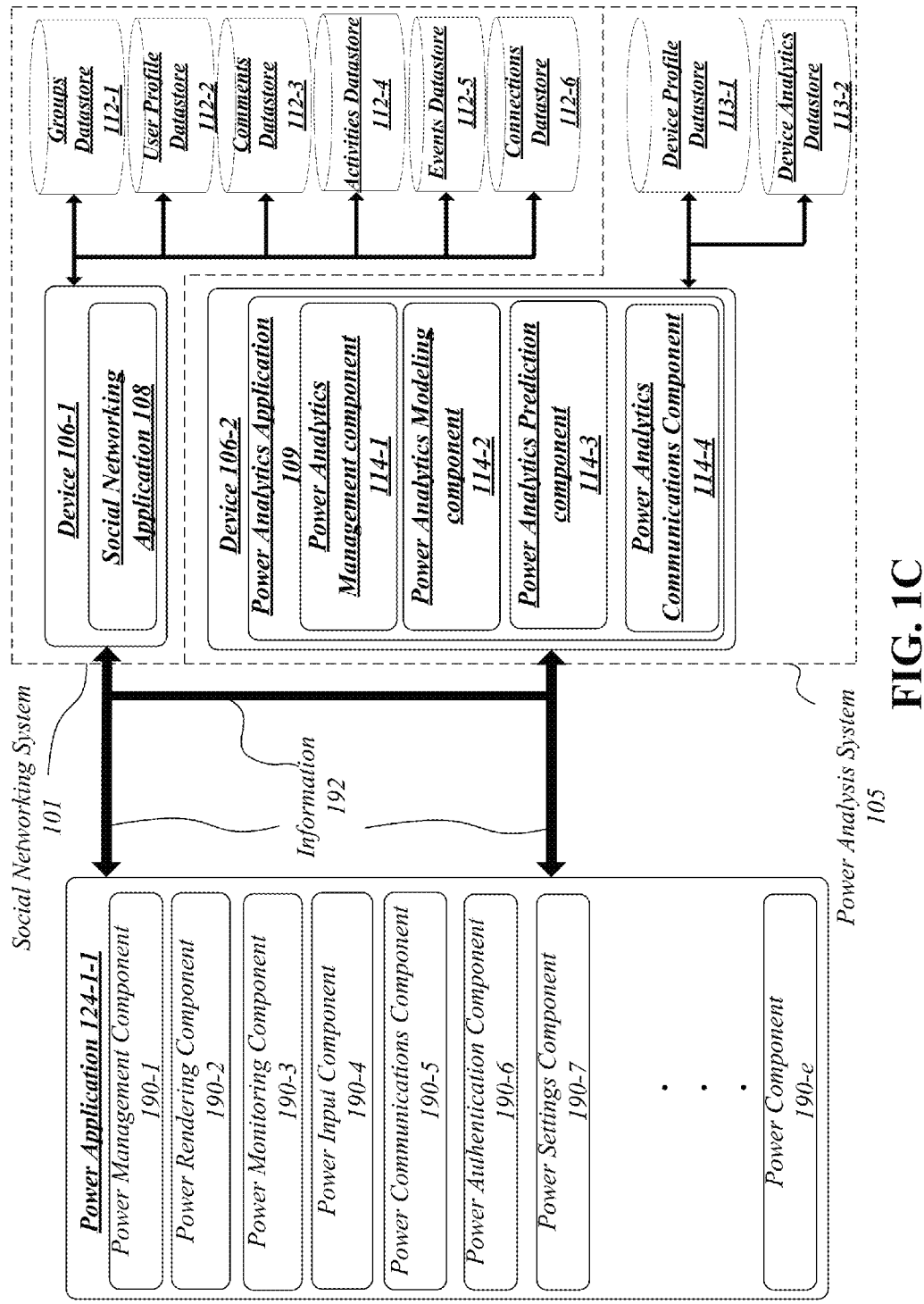
FIG. 1C illustrates an exemplary embodiment of the mobile power application for managing power utilization of a mobile device.

FIG. 1C illustrates an exemplary embodiment of the mobile power application 124-1-1 for managing power utilization of one or more mobile devices 102-a (e.g., mobile device 102-1). The power application 124-1-1 may include one or more power components 190-e. The one or more power components 190-e may include, but is not limited to, power management component 190-1, power rendering component 190-2, power monitoring component 190-3, power input component 190-4, and power communications component 190-5. Optionally, the one or more power components 190-e may further include, but is not limited to, power authentication component 190-6 and/or power settings component 190-7.

The power authentication component 190-6 may be generally arranged to authenticate a user having an associated user account in the social networking system 101 based on at least a portion of the user account information (e.g., user account identifier and user account authentication token) inputted by the user utilizing, for example, an on-screen virtual keyboard or any other input information. Once the user having the associated user account has been authenticated, the power authentication component 190-6 may be configured to receive one or more time limited access tokens from the social networking application 108, and store the one or more time limited access tokens in the storage component 150 and/or system memory 120 of the mobile device 102-1 for use by the one or more power components 190-e to access information in the social networking system 101 via the power communications component 190-5.

The power communications component 190-5 may be generally arranged to receive, transmit, and/or otherwise facilitate communications of information 192 between the one or more power components 190-e and the power analytics system 105 utilizing one or more APIs, one or more components of the mobile device 102-1 (e.g., the communications component 158), and/or communications network 103. Optionally, power communications component 190-5 may also be generally arranged to receive, transmit, and/or otherwise facilitate communications between the one or more power components 190-*e* and the social networking application 108 utilizing one or more APIs (e.g., graph API), the received, stored, and/or cached one or more time limited access tokens, one or more components of the mobile device 102-1 (e.g., the communications component 158), and communications network 103.

The power monitoring component 190-3 may be generally arranged to manage capturing device profile information and/or storing the captured device profile information. In some embodiments, the power monitoring component 190-3 may be configured to capture device application information (e.g., device application information 210-1 further discussed with respect to FIG. 2) by interfacing with one or more APIs of the operating system 122-1 (e.g., calling one or more API functions of the operating system 122-1, etc.) to retrieve and/or store a list of applications information for each application. The application information may include, but is not limited to, application identification information (e.g., application name, application identifier, etc.), application execution information (e.g., application execution state, application component utilization such as CPU utilization and/or GPU utilization of the processing component 126 of mobile device 102-1 by the application), and/or any other information associated with one or more applications 124-1-*b* of mobile device 102-1.

Figure 2:
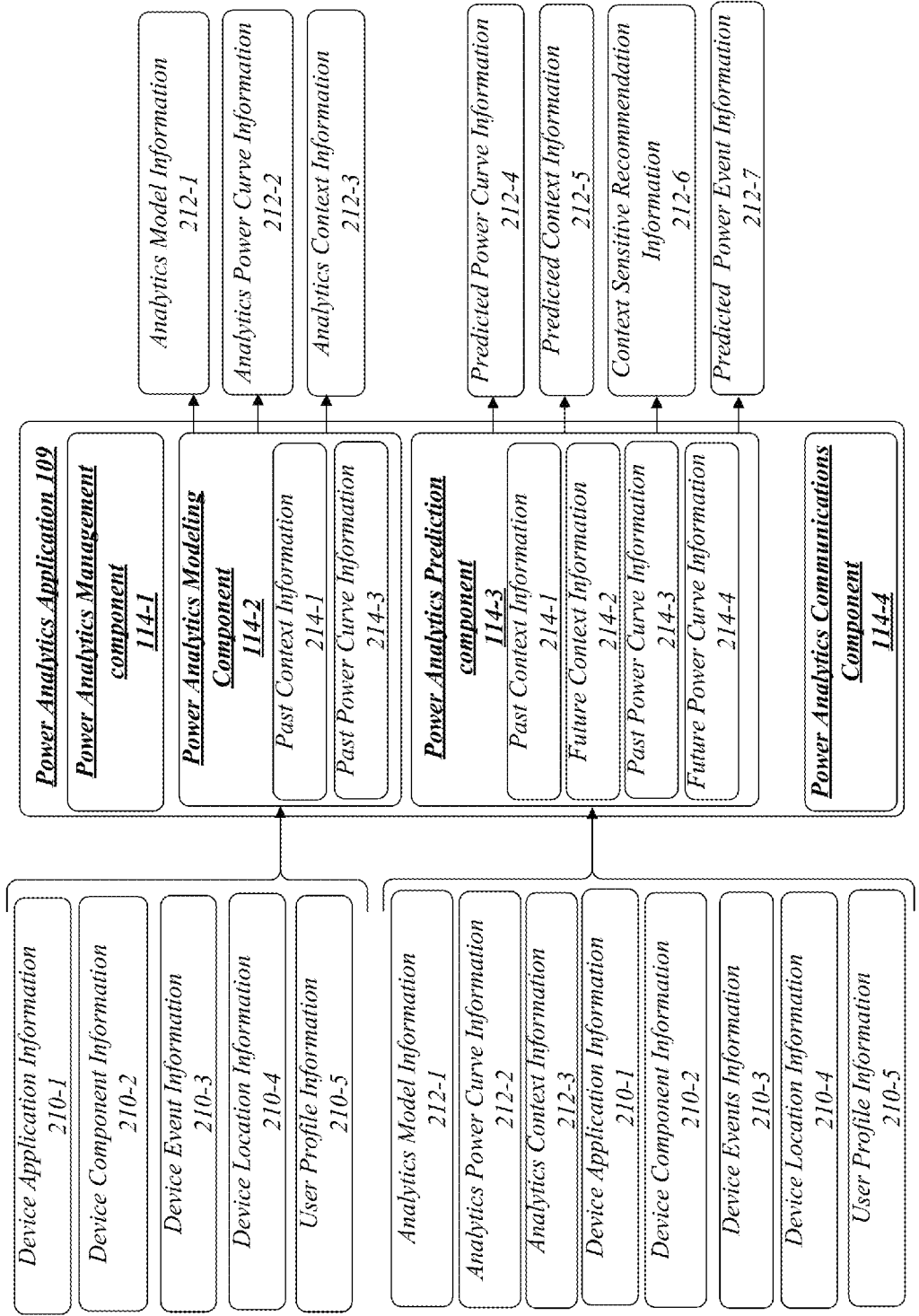
FIG. 2 illustrates an exemplary embodiment of determining predicted information and/or recommendation information.

In some embodiments, the power monitoring component 190-3 may also be configured to capture device component information (e.g., device component information 210-2 further discussed with respect to FIG. 2) by interfacing with one or more APIs of the operating system 122-1 (e.g., calling one or more API functions implemented or exposed by the operating system 122-1, etc.) and/or APIs of the one or more components (e.g., calling one or more API functions implemented or exposed by device drivers for one or more components) to retrieve and/or store a list of component information for one or more components of the mobile device 102-1. The component information for one or more components may include, but is not limited to, component identification information (e.g., component name, component identifier, etc.), component design information (e.g., design capacity for the power source component 184, design operating frequency or frequencies for the CPU and/or GPU of the processing component 126, etc.), component status information (e.g., current discharge rate for the power source component 184, current charge capacity for the power source component 184, current total CPU and/or GPU utilization of the processing component 126, etc.), current power state information (e.g., non-functional/disabled state, low power state, active state, high performance state, etc.), or any other information associated with one or more components of the mobile device 102-1.

In some embodiments, the power monitoring component 190-3 may also be configured to capture device event information (e.g., device event information 210-3 further discussed with respect to FIG. 2) representative of one or more device events associated with the mobile device 102-1 and/or the user of the mobile device 102-1 by interfacing with one or more APIs of the operating system 122-1, one or more APIs of the one or more components, and/or interfacing one or more APIs of the calendar application 124-1-11. Moreover, the device event information may further include, but is not limited to, one or more power events represented by device power event information (e.g., battery charge event, battery discharge event, etc.), one or more application events represented by device application event information (e.g., application install event, application uninstall event, application update event, etc.), and/or one or more calendar events represented by device calendar event information (e.g., appointments, meetings, reminders for the user of the mobile device 102-1).

In some embodiments, the power monitoring component 190-3 may also be configured to capture device location information by interfacing with one or more APIs of the operating system 122-1 and/or interfacing with one or more APIs of the location component. Moreover, the device location information may include, but is not limited to, device coordinates information (e.g., approximate GPS coordinates associated with the location of the mobile device 102-1, etc.).

It may be appreciated that because power monitoring component 190-3 may capture and/or store vast amounts of device profile information which may contain private information regarding the user, the users may utilize one or more UI views and/or UI elements visually presented by the power settings component 190-7 on a display screen (not shown) of the mobile device 102-1 to modify or update the privacy limitation information in order to preserve their privacy and limit the amount and type of information captured, stored, and/or otherwise transmitted by the power monitoring component 190-3.

In some embodiments, the device profile information may be captured, stored, and/or transmitted to the power analytics application 109 of the power analytics system 105 on a periodic basis (e.g., every 30 seconds, 1 minute, 5 minutes, 10 minutes, 15 minutes, etc.) based at least partially on mobile power application preferences information. For example, the device profile information may be captured, stored, and/or transmitted every 5 minutes while the power application 124-1-1 is executing in either in the foreground and/or background state, when the monitoring frequency information and/or transmission frequency information of the mobile power application preferences information indicate that the device profile information is to be captured, stored, and/or transmitted every 5 minutes.

The mobile power application preferences information may include, but is not limited to, monitoring frequency information (e.g., the frequency of capturing and/or storing device profile information by the application 124-1-1, etc.), transmission frequency information (e.g., the frequency of transmitting the captured and/or stored device profile information to the power analytics system 105, etc.), receipt frequency information (e.g., the frequency of requesting and receiving analytics information, predicted information, and recommendation information for the application 124-1-1, etc.), power reserve threshold limit information (e.g., the amount of power to be reserved on the mobile device, etc.), and/or privacy limitation information (e.g., privacy limitations on specific information to be captured, stored, and/or transmitted by the application 124-1-1, etc.)

The power rendering component 190-2 may be generally arranged to provide visual display information comprising to the touch sensitive display component 182 to render one or more UI views comprising one or more UI elements for visual presentation on the display device 168. In some embodiments, the power rendering component 190-2 may be further arranged to provide visual display information to the touch sensitive display component 182 to render one or more animated transitions between the one or more views and/or one or more animated UI elements for visual presentation on the display device 168.

The power input component 190-4 may be generally arranged to provide user input information which may include, but is not limited to, one or more gestures and provide character input information utilizing one or more components of the mobile device 102-1 (e.g., touch sensitive display component 182). In some embodiments, the power input component 190-4 may be configured to receive touch input information from the touch sensitive display component 182 and determine one or more finger gestures based at least partially on the received touch input information. In some embodiments, the power input component 190-4 may be configured to provide user input information including the character input information to the based on one or more characters inputted by a user utilizing an on-screen virtual keyboard visually presented on at least a portion of the display device 168. Moreover, the character input information may be determined based at least partially on one or more contacts detected in a predefined region associated with the on-screen virtual keyboard.

In some embodiments, the power input component 190-4 may be further configured to detect a selection finger gesture to select a selectable UI element based at least partially on the received touch input information, the received touched input information may include, but is not limited to, finger contact at a first location in a predefined region associated with the UI element visually presented on the display device 168 for a predefined time period (e.g., less than one second), and termination of the finger contact at the first location of the predefined region.

In some embodiments, the power input component 190-4 may be also configured to detect a scroll finger gesture to scroll a scrollable UI element and/or scrollable UI view based at least partially on the received touch input information, the received touched input information may include, but is not limited to, finger contact at a first location in a predefined region associated with the scrollable UI element and/or scrollable UI view visually presented on the display device 168, initiating movement of the finger contact within a predefined time period after the finger contact (e.g., less than one second), continuous movement of the finger contact from the first location to a second location in at least one direction (e.g., up direction, down direction, left direction, right direction, or any combination thereof), and termination of the finger contact at the second location.

It may be appreciated that in some embodiments, UI elements and/or UI views may be configured as selectable and/or scrollable, and the power input component 190-4 may be configured to determine the respective finger gesture based at least partially on the received touch input information.

The power settings component 190-7 may be generally arranged to manage the settings associated with the power application 124-1-1 utilizing one or more components of the mobile device 102-1 (e.g., touch sensitive display component 182, storage component 150, etc.). In some embodiments, the power settings component 190-7 may be configured to modify and/or update user mobile power application preferences information stored or cached in storage component 150 and/or system memory 120, based at least partially on user input information provided by the power input component 190-4.

In some embodiments, the power settings component 190-7 may be configured to modify, update, and/or otherwise synchronize the user mobile power application preferences information stored or cached in storage component 150 and/or system memory 120 with the user mobile power application preferences information stored in the power analytics system 105 and associated with device identifier information for a particular mobile device, so that any instance of the power applications 124-a-1 for a user may share and/or utilize the latest user mobile power application preferences information regardless of which mobile device the user is currently using. Additionally, the mobile power application preferences information may also be utilized by power analytics application 109 of the power analytics system 105 to generate and/provide analytics information, predicted information, and/or recommendation information to the mobile device of the user.

The power management component 190-1 be generally arranged to provide power management of the mobile device 102-1. To provide power management, the power management component 190-1 may be generally arranged to request or initiate monitoring device profile information of the mobile device 102-1, provide the device profile information to power analytics application 109, receive analytics power curve information, analytics context information, predicted power curve information, predicted context information, and context sensitive recommendation information, store or cache the received information in system memory 120 and/or storage component 150, provide the stored or cached information to the power rendering component 190-2 for visual presentation in one or more UI views.

In some embodiments, the power management component 190-1 may be configured to generate a device identifier information (e.g., a hexadecimal value) based at least partially on one or more components (e.g., media access control (MAC) address, international mobile state equipment identity (IMEI) of the communications component 158, etc.). The device identifier information may be configured to uniquely identify a mobile device (e.g., mobile device 102-1) and may be associated with the device profile information of the mobile device (e.g., mobile device 102-1) and/or the user profile information for the user of the mobile device (e.g., mobile device 102-1). The power management component 190-1 may be further configured to initiate the monitoring of device profile information of the mobile device 102-1 by the power monitoring component 190-3 on a periodic basis (e.g., every 30 seconds, 1 minute, 5 minutes, 10 minutes, 15 minutes, etc.) and transmit the collected device profile information to the power analytics management component 114-1 on a periodic basis.

In some embodiments, the power management component 190-1 may be further configured to receive analytics information (e.g., analytics model information, analytics power curve information, analytics context information), and predicted power curve information, predicted context information, and/or context sensitive recommendation information on a periodic basis (e.g., every 30 seconds, 1 minute, 5 minutes, 10 minutes, 15 minutes, etc.) based at least partially on mobile power application preferences information. Additionally or alternatively, the power management component 190-1 may be further configured to receive the information initiated by power analytics application 109 (e.g., push-based or server initiated, etc.), when the generated predicted power curve information indicates that the power utilization deviates from the analytics power curve information. Additionally or alternatively, the power management component 190-1 may be further configured to request and receive the information, in response to receiving user input to view the information (e.g., predicted power curve information, predicted context sensitive recommendation information, etc.)

In some embodiments, the power management component 190-1 may be configured to visually present one or more UI views (not shown) on a display screen of the touch sensitive display component 182. The one or more UI views may include, but is not limited to, one or more UI elements (not shown) configured to visually present analytics information, predicted information, recommendation information, and/or any other information to assist the user of the mobile device 102-1 in managing power utilization.

In some embodiments, the power management component 190-1 may optionally enable a user to log into the social networking system 101 via power authentication component 190-6 based at least partially on user account information. After the successful authentication of the user by the power authentication component 190-6 and receipt of the one or more time limited access tokens from the social networking application 108, the power management component 190-1 may initiate one or more requests for at least a portion of the user profile information associated with the user having the associated user account via the power communications component 190-5. Moreover, the user profile information may include, but is not limited to, user identifier information, user location information, user social connections information, user event information, and/or any other user profile information. The power management component 190-1 may also, optionally, provide at least a portion of the received user profile information to the power analytics application 109.

FIG. 2 illustrates an exemplary embodiment of determining predicted information and/or recommendation information. As illustrated in FIG. 2, the operating environment 200 may include, but is not limited to power analytics application 109 of the power analytics system 105. The power analytics application 109 may include, but is not limited to, power analytics management component 114-1.

In some embodiments, the power analytics management component 114-1 may be configured to receive device identifier information and device profile information associated with the received device identifier information from one or more devices 102-a (e.g., mobile device 102-1) and store the received device identifier information and device profile information associated with the received device identifier information in the device profile datastore 113-1. The device profile information may include, but is not limited to, device application information 210-1, device component information 210-2, device event information 210-3, and/or device location information 210-4.

Optionally, the power analytics management component 114-1 may also be configured to receive at least a portion of the user profile information 210-5 associated with the user of the mobile device having the associated device identifier information in the device profile datastore 113-1. The power analytics management component 114-1 may be further configured to store the received user profile information 210-5 and/or associate device identifier information in the device profile datastore 113-1.

In some embodiments, the power analytics management component 114-1 may be configured to request the generation of analytics information by the power analytics modeling component 114-2 and predicted information (e.g., predicted power curve information 214-4, predicted context information 212-5, predicted power event information 212-7, etc.) and/or recommendation information (e.g., context sensitive recommendation information 212-6, etc.) by the power analytics prediction component 114-3. The analytics information may include, but is not limited to, analytics model information 212-1, analytics power curve information 212-2, and/or analytics context information 212-3. The prediction information may include, but is not limited to, predicted power curve information 214-4 and predicted context information 212-5. The recommendation information may include, but is not limited to, context sensitive recommendation information 212-6.

In some embodiments the power analytics management component 114-1 may be configured to request the generation of analytics information, predicted information, and/or recommendation information on a periodic basis (e.g., every 5 minutes, every 10 minutes, every 15 minutes, etc.), and/or in response to one or more requests received from one or more devices 102-a for predicted information based at least partially on the user mobile power application preferences information associated with the mobile device (e.g., mobile 102-1). Additionally, in some embodiments, the power analytics management component 114-1 may be further configured to provide the generated analytics information, predicted information, and/or recommendation information on a periodic basis (e.g., every 5 minutes, every 10 minutes, every 15 minutes, etc.), and/or in response to the one or more to one or more requests received from one or more devices 102-a based at least partially on the mobile power application preferences information. Furthermore, the power analytics management component 114-1 may be configured to provide the analytics information, predicted information, and/or recommendation information, in response to determining, based on the current power utilization for a mobile device (e.g., mobile device 102-1, etc.), that the mobile device will likely fall below a power reserve threshold limit (e.g., power reserve threshold limit 344 further discussed with respect to FIG. 3D-3F, etc.) before reaching the time associated with a predicted charge event (e.g., predicted charge events 350-1, 350-2, 350-3 further discussed with respect to FIG. 3D-3F, etc.).

The power analytics application 109 may further include, but is not limited to, a power analytics modeling component 114-2 which may be generally arranged to analyze past or historic device profile information in order to estimate or forecast the power utilization of one or more mobile devices 102-a for a future set time period or interval on a reoccurring day of the week (e.g., 24 hour period of time for every Monday, etc.). Moreover, the power analytics modeling component 114-2 may be configured to receive device profile information for one or more mobile devices 102-a (e.g., mobile device 102-1, etc.) and/or optionally, at least a portion of user profile information for users of the one or more mobile devices 102-a. The power analytics modeling component 114-2 may be further configured to generate the analytics information (e.g., analytics model information 212-1, analytics power curve information 212-2, analytics context information 212-3, etc.) based at least partially on the received device profile information and/or user profile information utilizing well-known machine learning (e.g., decision tree learning, artificial neural networks, clustering, Bayesian networks, etc.) techniques, methods, and/or algorithms.

In some embodiments, the analytics power curve information 212-2 may be representative of a typical estimated or forecasted power utilization for the mobile device 102-1 during a set time period or interval for a recurring day of the week. In some embodiments, the analytics power curve information 212-2 may be generated utilizing well-known machine learning techniques, methods, and/or algorithms based at least partially on the aggregate of past power curve information 214-3 for multiple reoccurring days of the week (e.g., the past power curve information for every Monday, or the past context information for every Tuesday, etc.).

The past power curve information 214-3 may be representative of a power reserve versus time curve for the power utilization of the mobile device 102-1 as monitored, stored, and/or transmitted by the power application 124-1-1 before the current time but still within a set time period or interval for a recurring day of the week, i.e., a calculated usage of power utilization for the mobile device 102-1 up to the current time. By way of example, the past power curve information 214-3 may be representative of a power reserve versus time curve starting at time 12:00 AM to 8 AM on Monday for mobile device 102-1, when the current time is 8 AM on Monday and the power analytics management component 114-1 has been receiving device profile information from the mobile device 102-1 on a periodic basis since 12:00 AM on Monday. The example is not limited in this context.

In some embodiments, the power analytics modeling component 114-2 may be configured to generate the past power curve information 214-3 based at least partially on the device profile information (e.g., device application information 210-1, device component information 210-2, device events information 210-3, device location information 210-4, etc.) for the mobile device 102-1 received and/or time stamped during a set time period or interval in the past (e.g., set time period from 12:00 AM to 11:59 PM) to the current or present time (e.g., 8 AM) for the reoccurring day of the week (e.g., Monday) for mobile device 102-1.

In some embodiments, the generated analytics power curve information 212-2 may include, but is not limited to, one or more power reserve versus time curves for the set time period or interval. In some embodiments, the one or more power reserve versus time curves may also contain one or more estimated or approximate charge events during the set time period or interval. Additionally, in some embodiments, the power reserve, which may be typically associated with ampere-hour (Ah) or milliampere-hour (mAh), may be normalized on a scale between 0 and 100 to indicate the percentage of the remaining power reserve with respect to time, regardless of actual capacity of battery 188.

In some embodiments, the generated analytics model information 212-1 may include, but is not limited to, analytics power utilization information and/or analytics runtime information. The analytics power utilization information may be representative of one or more power models that estimate or approximate the power utilization of one or more applications 124-1-b, the operating system 122-1, and/or the one or more components of the mobile device 102-1 as one or more linear and/or non-linear power utilization functions. For example, the one or more linear and/or nonlinear discrete or continuous functions with one or more input parameters including, but is not limited to, a time duration parameter (e.g., 15 minutes, 30 minutes etc.) and starting power reserve parameter and output of a linear or nonlinear discrete or continuous power utilization curve that approximate the power utilization for that time duration and starting power reserve. The analytics runtime information may be representative of average foreground and/or background execution time of the one or more applications 124-1-b, during one or more analytics contexts (e.g., meetings, appointments, reminder, social events, etc.) or in response to one or more device application events (e.g., installing the one or more application, updating one or more application, etc.).

By way of example, the one or more linear and/or non-linear power utilization functions may include, but is not limited to, a function that estimates or approximates the power utilization of an application such as the audio/video application 124-1-12 executing in the foreground state and visually presenting video information on the touch sensitive display component 182 for a specific period of time on the mobile device 102-1. In another example, the one or more linear and/or non-linear power utilization functions may include, but is not limited to, a function that estimates or approximates the power utilization of an application such as the audio/video application 124-1-12 executing in the background state and recording audio for a specific period of time on the mobile device 102-1. The examples are not limited in this context.

In some embodiments, the power analytics modeling component 114-2 may be configured to generate analytics context information 212-3 utilizing well-known machine learning techniques, methods, and/or algorithms based at least partially on the aggregate of past context information 214-1 for multiple reoccurring days of the week (e.g., the past context information for every Monday, or the past context information for every Tuesday, etc.) The past context information 214-1 may be representative of one or more past contexts (e.g., past contexts 342-1 of FIG. 3D, etc.) that already occurred at an approximate time, approximate location, for an approximate duration in the past. By way of example, an exemplary past context may include a meeting that has already occurred between 9:30 AM and 10:30 AM at Location D on Monday, when the current day and time is Monday at 11:00 AM. The example is not limited in this context. In some embodiments, the power analytics modeling component 114-2 may be configured to generate the past context information 214-1, based at least partially on device profile information (e.g., device event information 210-3, device location information 210-4, etc.) and/or optionally, user profile information 210-5 (e.g., user event information, user location information, etc.) for a set time period or interval of a recurring day of the week. The generated past context information 214-2 may include, but is not limited to, past location context information, past event context information, and/or past application context information.

The past location context information may be representative of one or more past location contexts that identify one or more past locations in a past set time period or interval of time for a reoccurring day of the week. Each past location context may be associated with a past location context start time, past location context end time, past location context duration, and/or past location category (e.g., home, work, school, traveling, etc.).

The past event context information may be representative of one or more past events contexts that identify one or more past device events represented by device event information 215-3 (e.g., device power events represented by device power event information, device application events represented by device application event information, device calendar events represented by device calendar event information, etc.) and/or optionally, one or more past social events represented by user event information of the user profile information 210-5. Each past event contexts may be associated with a past event context start time, past event context end time, past event context duration, past event category (e.g., calendar event, power event, application event, social event, etc.), and/or past event sub-category associated with each past event category (e.g., appointments, meetings, and/or reminders associated with calendar event category, and/or social event category, battery charge event and/or battery discharge event associated with power event category, application install event, application uninstall event, and/or application update event associated with application event category, etc.).

The past application context information, may be representative of one or more past application contexts. The one or more past application context may correspond to and/or be associated with a past location context and/or past event context represented by the past event context information and/or past location context information, respectively. Each past application context may also provide a list of applications that may have been executed during, after, and/or substantially contemporaneously (e.g., within 5 minutes, 10 minutes, 15 minutes, etc.) with the occurrence of a past location context and/or past event context. For example, a past application context may correspond to or be associated with a past event context (e.g., an application install event, etc.) represented by past event context information to store and/or provide lists of applications that have been executed during, after, and/or substantially contemporaneously (e.g., within 5 minutes, etc.) to the occurrence of that past event context (e.g., the application install event, etc.).

In some embodiments, each past application context may also be associated with past runtime information. The past runtime information may be representative of past mobile device 102-1 component utilization (e.g., processing component 126 utilization, etc.) for each application that the mobile device 102-1 has executed during the corresponding past location context information, past event context information, so that one or more predominant applications (e.g., applications with the highest processing component 126 utilization, etc.) and/or non-predominant applications utilized may be identified. The past runtime information may also include, but is not limited to, application execution duration and their respective execution states (e.g., foreground state, background state, suspended state, etc.) for each application that was executed in the past during, after, and/or substantially contemporaneously (e.g., within 5 minutes, 10 minutes, 15 minutes, etc.) with the occurrence of one or more past location contexts and/or past event contexts.

The generated analytics context information 212-3 may be representative of one or more estimated or forecasted analytics contexts that may or is likely to occur at an approximate or estimated time, an approximate or estimated location, for an approximate or estimated duration in the future but has not yet occurred. Each estimated or forecasted analytics context may substantially correspond to at least a portion of an analytics power curve represented by the analytics power curve information 212-2. In some embodiments, the generated analytics context information 212-3 may include, but is not limited to, analytics location context information, analytics event context information, and/or analytics application context information.

The analytics location context information may be representative of one or more analytics location contexts that identify an estimated or forecasted location for a user in a future set time period on a reoccurring day of the week, which may further infer the general activity or activities for the user during the set time period or interval of time on the recurring day of the week. Each analytics location context may be associated with an analytics location context start time, analytics location context end time, analytics location context duration, and/or analytics location category (e.g., home, work, school, traveling, etc.).

The analytics event context information may be representative of one or more analytics event contexts that identify one or more estimated or forecasted device events and/or optionally, one or more social events of the user during a future set time period or interval on a recurring day of the week. Each analytics event context may be associated with an analytics event context start time, analytics event context end time, analytics event context duration, analytics event category (e.g., calendar event, power event, application event, social event, etc.), analytics event sub-category associated with each past event category (e.g., appointments, meetings, and/or reminders associated with calendar event category and/or social event category, battery charge event and/or battery discharge event associated with power event category, application install event, application uninstall event, and/or application update event associated with application event category, etc.).

The analytics application context information, may be representative of one or more analytics application contexts. The one or more analytics application context may correspond to and/or be associated with an analytics location context represented by the analytics location context information and/or analytics event context analytics event context information. Each analytics application context may also provide an estimated or forecasted list of applications for each analytics location context and/or analytics event context that the mobile device 102-1 is estimated or forecasted to execute during, after, and/or substantially contemporaneously (e.g., within 5 minutes, 10 minutes, 15 minutes, etc.), with each analytics location context and/or analytics event context. For example, an analytics application context may correspond to or be associated with a device application event (e.g., application install event, etc.) to provide an estimated or forecasted list of applications that may is estimated or forecasted to be executed during, after, and/or substantially contemporaneously (e.g., within 5 minutes, 10 minutes, 15 minutes, etc.) to the occurrence of that device application event (e.g., application install event, etc.).

In some embodiments, each analytics application context may also provide analytics runtime information. The analytics runtime information may be representative of estimated or forecasted mobile device 102-1 component utilization (e.g., processing component 126 utilization, etc.) for each application estimated or forecasted for execution by the mobile device 102-1, so that one or more predominant applications (e.g., applications with the highest processing component 126 utilization, etc.) and/or non-predominant applications utilized may be identified. The analytics runtime information may also include, but is not limited to, estimated or forecasted application execution duration and their respective execution states (e.g., foreground state, background state, suspended state, etc.) for each application estimated or forecasted for execution by the mobile device 102-1 during, after, and/or substantially contemporaneously (e.g., within 5 minutes, 10 minutes, 15 minutes, etc.) with the occurrence of one or more analytics location contexts and/or analytics event contexts.

It may be appreciated that the analytics application context information may be utilized by the power analytics prediction component 114-3 to estimate or forecast the likely list of applications that the mobile device 102-1 may execute and/or pending to execute for a given context and/or in response to a device application event. Additionally, the analytics application context information may also be utilized by the power analytics prediction component 114-3 to determine the predominant applications and/or non-predominant applications that are executed for a given context and/or in response to a device application event based at least partially on component utilization of the mobile device 102-1 (e.g., processing component utilization, etc.).

The power analytics application 109 may further include, but is not limited to, power analytics prediction component 114-3 configured to receive generated analytics information, device profile information, and/or optionally, at least a portion of user profile information to generate predicted information including power curve information 212-4, predicted context information 212-5, predicted power event information 212-7, and/or recommendation information including context sensitive recommendation information 212-6.

In some embodiments, the predicted context information 215-5 may include, but is not limited to, past context information 214-1, future context information 214-2, and/or analytics context information 212-3. The future context information 214-2 may be representative of one or more future contexts scheduled, planned, or otherwise anticipated to occur at an approximate time, an approximate location, for an approximate duration in the future but has not yet occurred. By way of example, an exemplary future context may include, but is not limited to, a scheduled meeting at Location D from 9:30 AM until 10:30 AM on Monday when the current time is 8 AM on Monday. The example is not limited in this context. In some embodiments, the power analytics prediction component 114-3 may be configured to generate the future context information 214-2 representative of one or more future contexts (e.g., future contexts 362-1, 362-2, 362-3 further discussed with respect to FIG. 3E, etc.) based at least partially on device calendar event information 210-3 representative of one or more device calendar events (e.g., one or more scheduled appoints, meetings, reminders, application install events, application update events, etc.) and/or optionally, user event information representative of one or more user events (e.g., one or more social events, etc.) of the user profile information 210-5. The generated future context information 214-2 may include, but is not limited to, future location context information, future event context information, and/or future application context information.

The future location context information may be representative of one or more future location contexts that identify a scheduled, planned, or otherwise anticipated location for a user and consequently, the mobile device 102-1 of the user, which may further infer the general activity or activities for the user during a future set time period or interval on a recurring day of the week. Each future location context may be associated with a future location context start time, future location context end time, future location context duration, and/or future location category (e.g., home, work, school, traveling, etc.).

The future event context information may be representative of one or more future events contexts that identify scheduled, planned, or otherwise anticipated device events (e.g., device calendar events such as a scheduled meeting, etc.) and/or optionally, one or more social events (e.g., a scheduled social event represented by user event information, etc.) for the mobile device 102-1 and/or user during a future set time period or interval on a recurring day of the week. Each future event context may be associated with a future event context start time, future event context end time, future event context duration, future event category (e.g., calendar event, power event, application event, social event, etc.), future event sub-category associated with each past event category (e.g., scheduled appointments, meetings, and/or reminders associated with calendar event category, and/or social event category, scheduled battery charge event and/or battery discharge event associated with power event category, scheduled application install event, application uninstall event, and/or application update event associated with application event category, etc.).

The future application context information, may be representative of one or more future application contexts. The one or more future application context may correspond to and/or be associated with future location context or future event context and provide a list of applications for each future event context and/or future location context represented by the future event context information and/or future location context information, respectively, that is estimated or forecasted to be executed during, after, or substantially contemporaneously with each future event context and/or future location context by the mobile device 102-1. For example, a future application context may correspond to or be associated with a future event context (e.g., a calendar event such as a scheduled meeting, etc.) to provide an estimated or forecasted lists of applications that may be executed during, after, or substantially contemporaneously (e.g., within 5 minutes, 10 minutes, 15 minutes, etc.) to the occurrence of that future event context (e.g., the calendar event such as the scheduled meeting, etc.).

In some embodiments, each future application context may also be associated with future runtime information. The future runtime information may be representative of estimated or forecasted mobile device 102-1 component utilization (e.g., processing component 126 utilization, etc.) for each application estimated or forecasted for execution, so that one or more predominant applications (e.g., applications with the highest processing component 126 utilization, etc.) and/or non-predominant applications utilized may be identified. The future runtime information may also include, but is not limited to, application execution duration and their respective execution states (e.g., foreground state, background state, suspended state, etc.) for each application that is estimated or forecasted to be executed duration during, after, and/or substantially contemporaneously (e.g., within 5 minutes, 10 minutes, 15 minutes, etc.) with the occurrence of one or more future location contexts and/or future event contexts.

It may be appreciated that while some future event contexts such as, for example, calendar events and/or social events associated with the calendar application 124-1-11 and/or social networking system 101, respectively, are unlikely to list one or more applications 124-1-*b* that may be executed by the mobile device 102-1 during those events (e.g., calendar events, social events, etc.), the power analytics prediction component 114-3 may determine the estimated or forecasted list of applications that may be executed during one or more future location contexts and/or future event contexts by matching at least partially a future location context and/or future event context with analytics location context and/or analytics event context (e.g., matching based on the future location category and/or future event category with analytics location category and/or analytics event category, etc.).

To generate the predicted context information 212-5, in some embodiments, the power analytics prediction component 114-3 may be configured to replace one or more analytics contexts represented by the analytics context information 212-3 with one or more future contexts of the future context information 214-2 for a set time period or interval within a recurring day of the week. Additionally, for any set time period in the past or that has already occurred, at least a portion of the analytics context information 212-3, and/or future context information 214-2 may be replaced with past context information 214-1.

The predicted power curve information 212-4 may be configured to provide an estimate or forecast of the power utilization for the mobile device 102-1 based at least partially on past power utilization within a set time period or interval and future power utilization within a set time period or interval. In some embodiments, the predicted power curve information 212-4 may be generated based at least partially on past power curve information 214-3, future power curve information 214-4, and/or analytics power curve information 212-2.

The future power curve information 214-4 may be representative of future estimated or forecasted power utilization for one or more future contexts (e.g., future location contexts, future event contexts, etc.) and/or estimated or forecasted power utilization for one or more device application events (e.g., application install event, application update event, application uninstall event, etc.). In some embodiments, the power analytics prediction component 114-3 may generate the future power curve information 214-4 for one or more future contexts, based at least partially on an aggregate and/or summation of analytics power utilization information of the analytics model information 212-1 for one or more applications 124-1-b (e.g., aggregate or summation of one or more linear and/or nonlinear functions, etc.) that the mobile device 102-1 is estimated or forecasted to execute for an estimated or forecasted duration. The estimated or forecasted applications to execute for an estimated or forecasted duration during a future context (e.g., future location contexts, future event contexts, etc.) may be determined based at least partially on analytics runtime information of the analytics context information 212-3 for the one or more applications 124-1-b generated by the power analytics modeling component 114-2 for the mobile device 102-1.

By way of example, if a given future location context and/or future event context is a scheduled meeting at Location D for 9:30 AM until 11:00 AM on Monday, the future application context information may indicate that the list of applications executed by the mobile device 102-1 for a typical meeting at Location D may include audio/video application 124-1-12 (e.g., recording of audio, etc.), management application 124-1-2, e-mail application 124-1-6, calendar application 124-1-111, and/or phone application 124-1-5. The power analytics prediction component 114-3 may generate the future power curve information for the meeting at Location D between 9:30 AM until 10:30 AM on Monday based at least partially on an aggregate and/or summation of linear and/or nonlinear functions associated with the audio/video application 124-1-12 (e.g., recording of audio, etc.), management application 124-1-2, e-mail application 124-1-6, calendar application 124-1-111, and/or phone application 124-1-5. The example is not limited in this context.

In some embodiments, the power analytics prediction component 114-3 may also be configured to generate the future power curve information 214-4 for one or more device application events (e.g., device application install event, device application uninstall event, device application update event, etc.). The future power curve information 214-4 may be generated for one or more device application events based at least partially on analytics information (e.g., analytics application context information of the analytics context information 212-3 corresponding to one or more device applications events, analytics model information 212-1, etc.) generated for mobile device 102-1.

It may be appreciated that in instances when a device application event for the mobile device 102-1 is an application installation event and/or application update event for a newly installed and/or updated application that the mobile device 102-1 has not previously executed (i.e., if the newly installed and/or updated application is executed, it would be first time the mobile device 102-1 is executing the newly installed and/or updated application), the power analytics prediction component 114-3 may be configured to determine the estimated or forecasted applications that the mobile 102-1 may execute and the duration of that execution after or substantially contemporaneous with the device application event based at least partially on analytics information (e.g., analytics application context information of analytics context information 212-3, analytics model information 212-1, etc.) for other mobile devices (e.g., mobile device 102-2, 102-3, etc.). To ensure that the estimated or forecasted power utilization is substantially approximate for mobile device 102-1, the analytics information (e.g., analytics context information 212-3, analytics model information 212-1, etc.) for other mobile devices generated by the power analytics modeling component 114-2 may be utilized, when the other mobile devices are substantially similar to the mobile device 102-1 (e.g., the one or more components of the mobile devices are substantially similar or the same, etc.) and/or the other mobile devices have executed the newly installed or updated application after or substantially contemporaneously with the installation or update of the newly installed or updated application. This may enable the power analytics application 109 to approximately predict the power utilization of the mobile device 102-1, based on power utilization of other mobile devices when a new application is installed on the mobile device 120-1.

To more accurately predict the estimated or forecasted power utilization, the power analytics prediction component 114-3 may optionally determine the estimated or forecasted applications that the mobile device 102-1 may execute based at least partially on the analytics information (e.g., analytics context information 212-3, analytics model information 212-1, etc.) for the other mobile devices (e.g., mobile device 102-2, 102-3, etc.), when users of the other mobile devices are socially connected (e.g., friends, family, etc.) with the user of mobile device 102-1 based at least partially on user social connections information of the user profile information associated with at least one user in the social networking system 101. Additionally, to ensure that the predictions are substantially accurate, in some embodiments, the power analytics prediction component 114-3 may further determine estimated or forecasted applications executed by the mobile device 102-1, based on analytics information of the other mobile devices that are substantially similar to mobile device 102-1 (e.g., the one or more components of the mobile devices are substantially similar or the same, etc.), and/or analytics information of the other mobile devices have executed the newly installed or updated application after or substantially contemporaneously with the installation or update of the new application. This may enable the power analytics application 109 to improve prediction of the power utilization of the mobile device 102-1, based on power utilization of other mobile devices when a new application is installed on the mobile devices and the users of other mobile devices are friends of the user of mobile device 102-1 presume that the user's actions on the mobile device 102-1 are more likely to be similar to those of his/her friends, family, and the like rather than strangers.

Figure 3A:
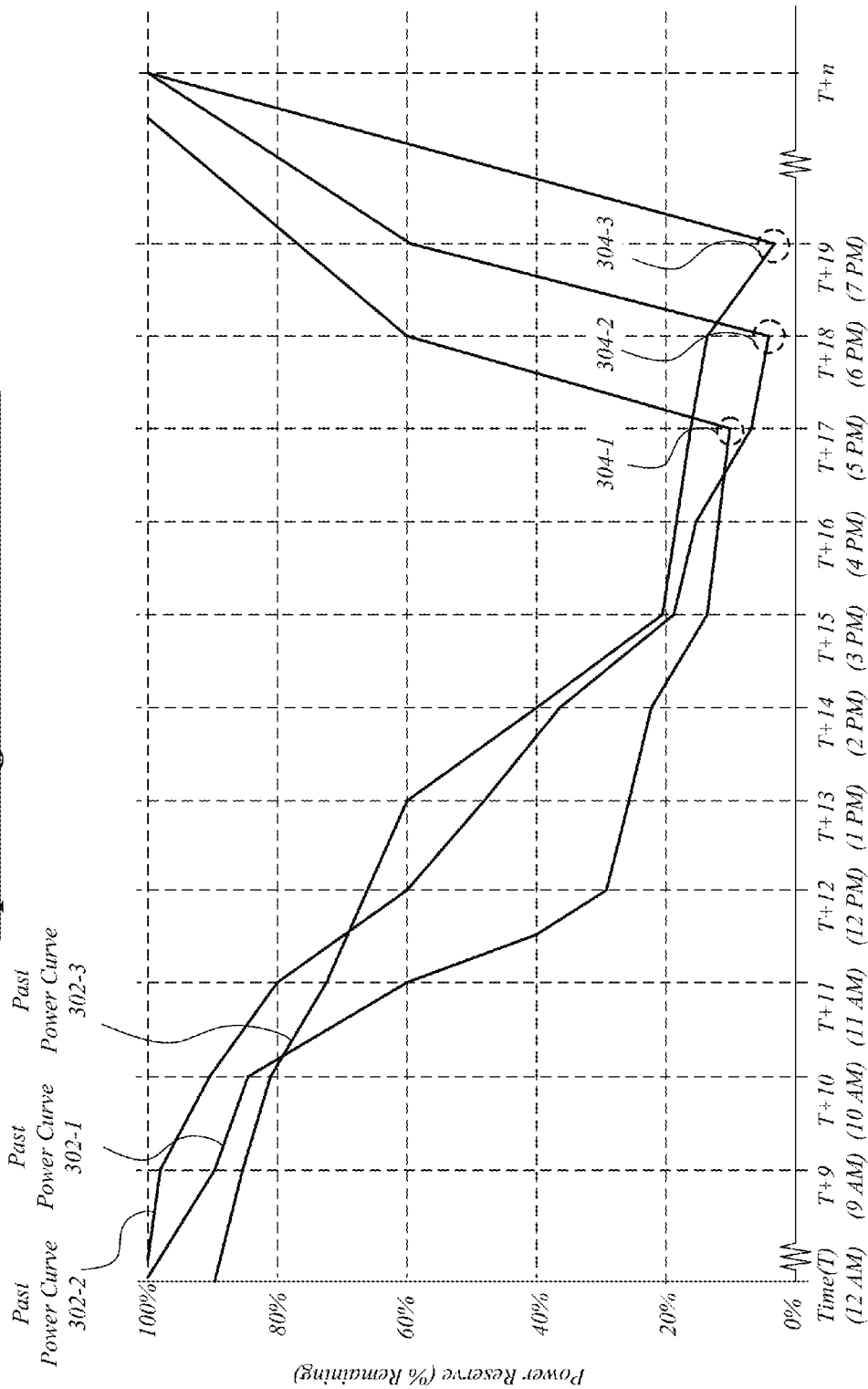
FIG. 3A illustrates exemplary embodiment of past power curve information.
Figure 3B:
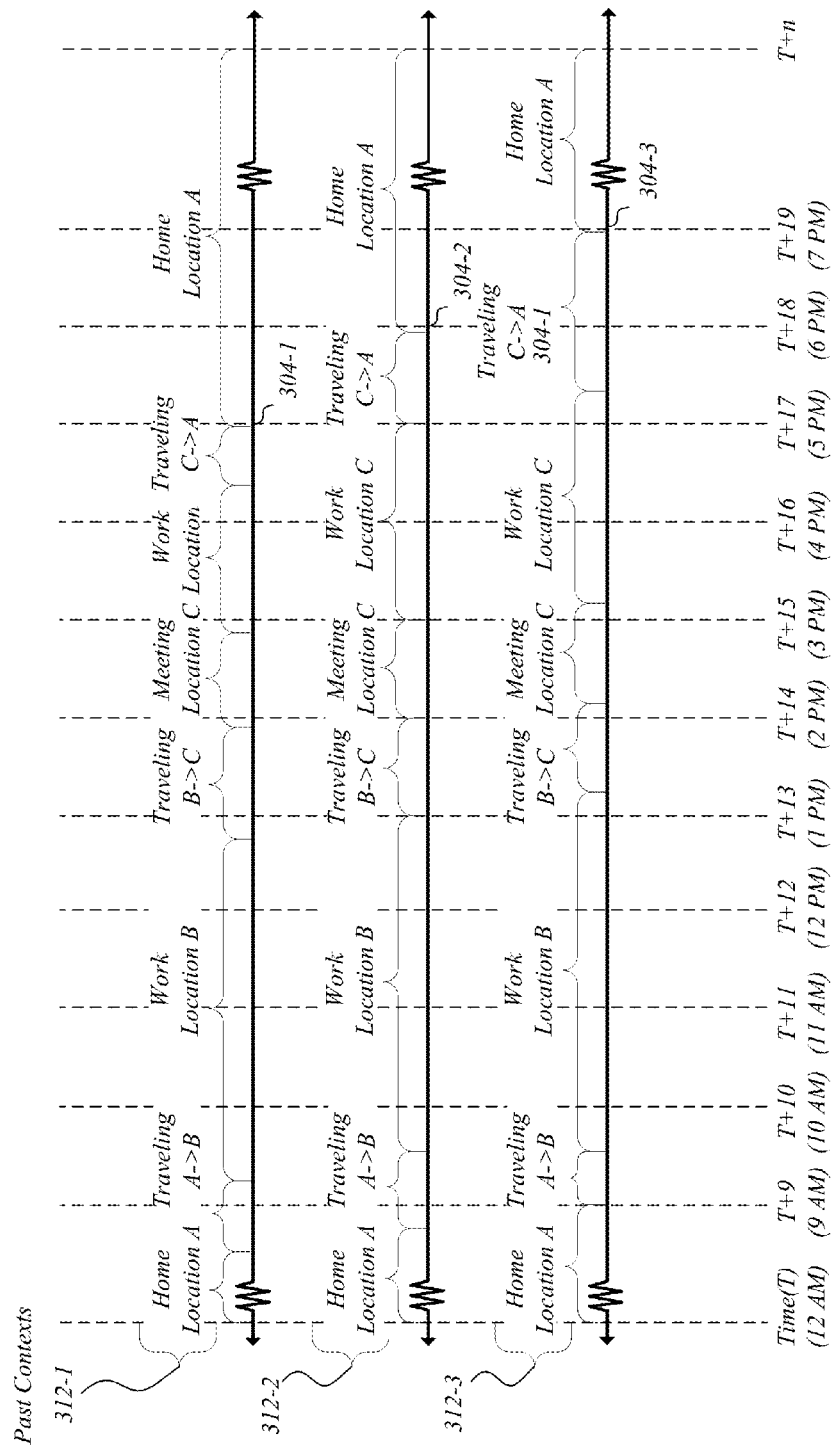
FIG. 3B illustrates exemplary embodiment of past context information.
Figure 3C:
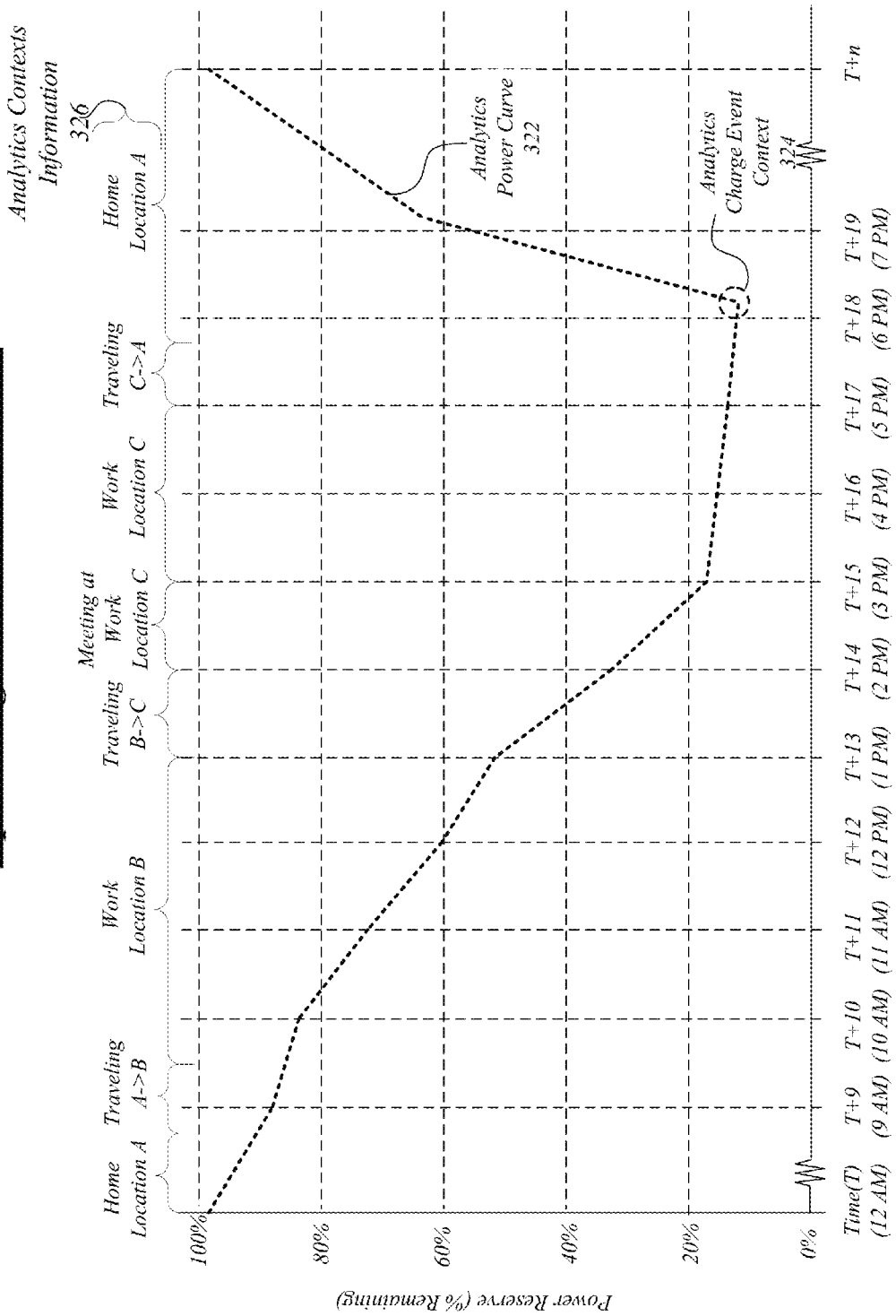
FIG. 3C illustrates exemplary embodiment of analytics information.
Figure 3D:
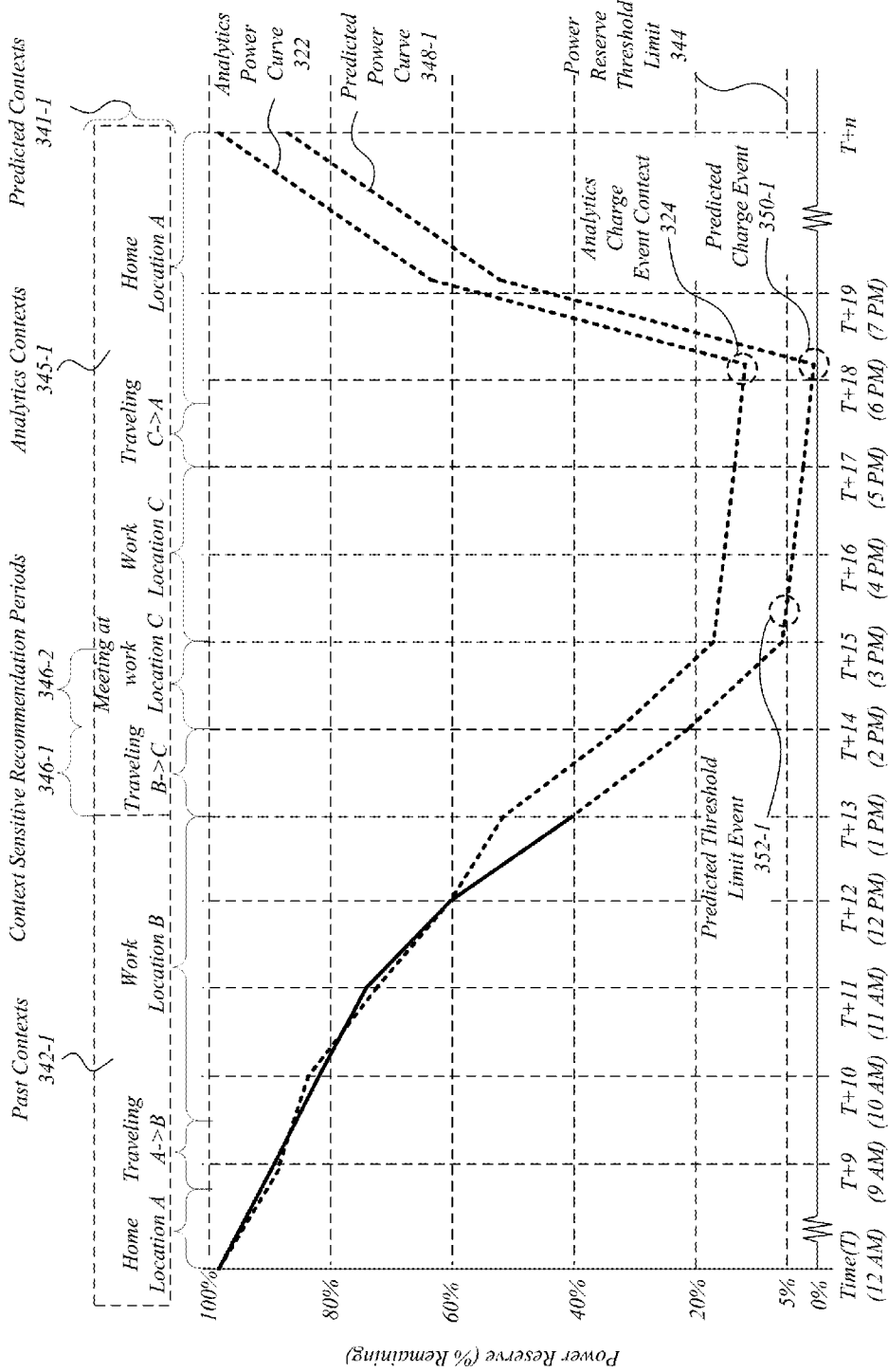
FIG. 3D illustrates a first exemplary operating environment of predicted information and/or recommendation information.
Figure 3E:
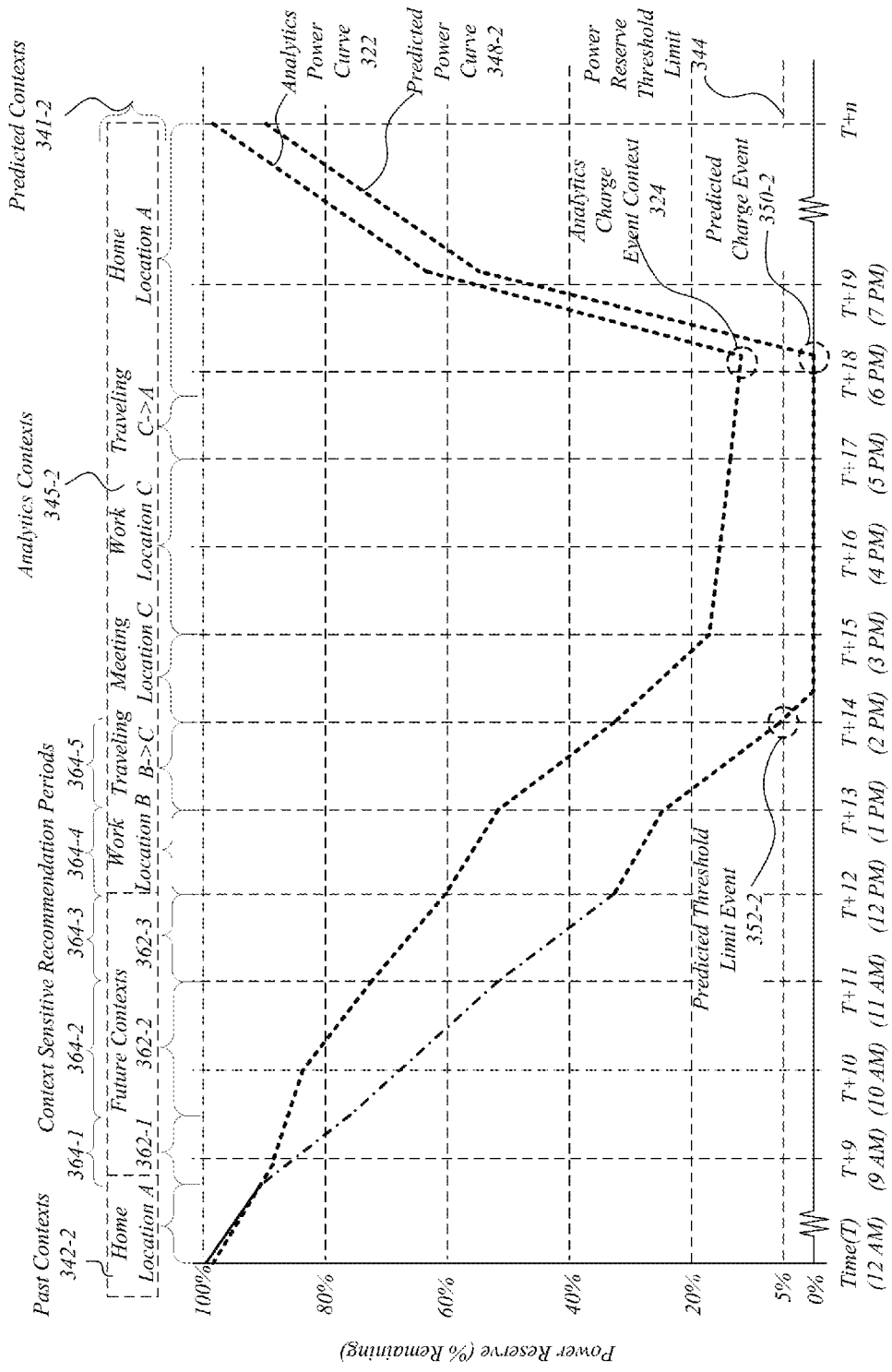
FIG. 3E illustrates a second exemplary operating environment of predicted information and/or recommendation information.
Figure 3F:
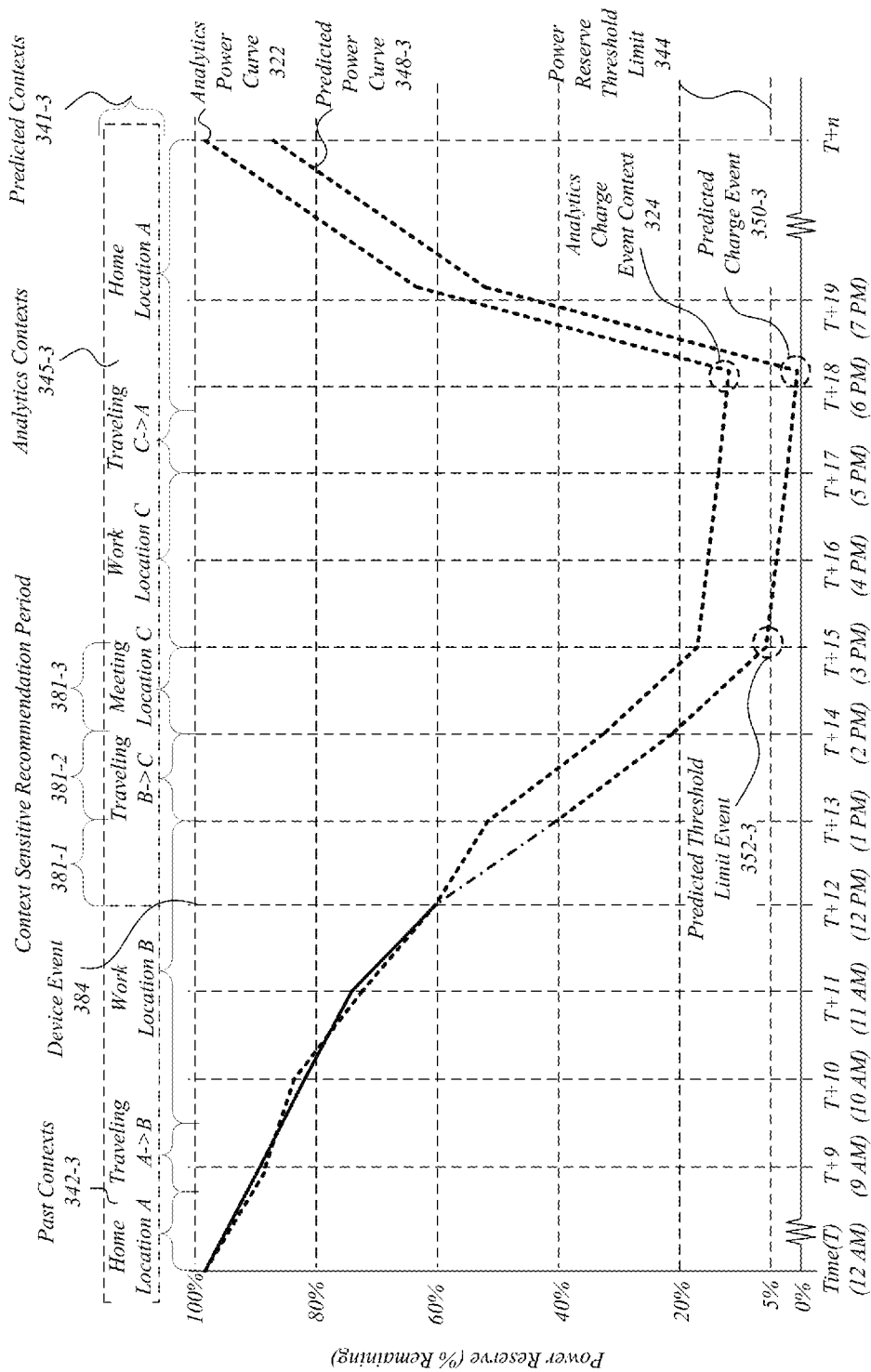
FIG. 3F illustrates a third exemplary operating environment of predicted information and/or recommendation information.

In some embodiments, the power analytics prediction component 114-3 may be configured to generate predicted power curve information 212-4 based at least partially on analytics power curve information 212-2, future power curve information 214-3, and/or past power curve information 214-3 further discussed with respect FIG. 3D-3F.

The predicted power event information 212-7 may be configured to provide one or more predicted threshold limit events (e.g., predicted threshold limit event 352-1 further discussed with respect to FIG. 3D, etc.) and/or one or more predicted charge events (e.g., predicted charge event 350-1 further discussed with respect to FIG. 3D, etc.). The predicted threshold limit events, represented by predicted threshold limit event information, may provide an estimate or forecast of the approximate time and approximate power reserve the mobile device 102-1 may fall below a predetermined threshold (e.g., power reserve threshold limit 344 further discussed with respect to FIG. 3D-3F, etc.). The predicted charge events, represented by predicted charge event information, may provide an approximate time and power reserve the battery 188 of the mobile device 102-1 may be charged by the user. In some embodiments, the predicted power curve information 212-4, may include and/or be associated with one or more predicted threshold limit events (e.g., predicted threshold limit event 352-1 further discussed with respect to FIG. 3D, etc.) and/or one or more predicted charge events (e.g., predicted charge events 350-1 further discussed with respect to FIG. 3D, etc.). The power analytics prediction component 114-3 may generate predicted power event information 212-7 based at least partially on the generated predicted power curve information 212-4, predicted context information 212-5, analytics power curve information 212-2, analytics context information 212-3, and/or power reserve threshold limit information of the mobile power application preferences information (not shown).

The power analytics prediction component 114-3 may be further configured to generate context sensitive recommendations information 212-6 for providing one or more context sensitive recommendations corresponding to one or more predicted contexts to the mobile device 102-1 for visual presentation on a display screen of the mobile device 102-1. In some embodiments, the power analytics prediction component 114-3 may be configured to provide context sensitive recommendations, when predicted power event information 212-7 indicates that a predicted thresh hold limit event that the power reserve for the mobile device 102-1 will fall below a predetermined threshold (e.g., power reserve threshold limit 344 further discussed with respect to FIG. 3D-3F) before the predicted charge event in a set time period or interval on a reoccurring day of the week. Moreover, based at least partially on the predicted context before the estimated or forecasted time of the predicted threshold limit event, the power analytics prediction component 114-3 may be configured to generate one or more context sensitive recommendations based at least partially on the predicted contexts.

In some embodiments, the context sensitive recommendation may include, one or more context sensitive application recommendations, context sensitive component recommendations, and/or context sensitive power recommendations. The context sensitive application recommendations may be visually presented to recommend to close and/or terminate one or more non-predominant applications executing in a foreground state, background state, or pending execution in a suspended state based at least partially on predicted context information. This may enable users to continue to use the predominant application (e.g., continuing to use location application 124-1-10 for navigation while traveling between locations, continuing to use audio/video application 124-1-12 for recording during a meeting, etc.) in a given context while reducing overall power utilization of the mobile device 102-1 by closing or terminating unnecessary applications. Additionally, the context sensitive application recommendations may also be visually presented to recommend not launching one or more applications 124-1-*b* having high power utilization, disabling one or more application specific features for one or more applications 124-1-*b*, configuring one or more applications 124-1-*b* to a low power state, or any other recommendation that may assist the user in reducing power consumption. Moreover, the power analytics prediction component 114-3 may be configured to determine the one or more high power utilization applications based at least partially on a comparison of one or more linear and/or nonlinear functions representative of power utilization of one or more applications 124-1-*b* represented by the analytics application model information.

The context sensitive component recommendations may be visually presented to recommend the user to configure one or more components to a low power state or disabled state based at least partially on the context sensitive application recommendations and/or predicted context information. Moreover, the power analytics prediction component 114-3 may be configured to determine which components utilized by non-predominant applications may be configured to operate in a low power state or disabled state without disabling or preventing the use of one or more predominant applications.

By way of example, the context sensitive component recommendation during a meeting may include, but is not limited to, disabling at least a portion of the communications component 158, acceleration component 180, haptic component 172, when the predominant application utilized during the meeting is audio/video application 124-1-12. In another example, the context sensitive component recommendation during traveling may include, but is not limited to, placing the touch sensitive display component 182 in a low power state by reducing the display screen brightness, when the predominant application utilized during traveling is location component 124-1-10.

The context sensitive power recommendations may be visually presented recommend charging the mobile device 102-1 and/or configuring the mobile device 102-1 to a low power state (e.g., disabling one or more components of the mobile device 102-1 and/or terminating one or more applications 124-1-*b* executing or pending for execution on the mobile device 102-1) or disabled state (e.g., turned off, etc.) based at least partially on predicted context information. Moreover, the power analytics prediction component 114-3 may be configured to identify one or more charging opportunities based at least partially on predicted context information and/or predicted power curve information. This may enable the power analytics prediction component 114-3 to generate context sensitive power recommendations that may recommend the user to charge the mobile device 102-1, when the predicted context information 215-5 indicates that charging the mobile device practical. Additionally or alternatively, the context sensitive power recommendation may also recommend the user to configure the mobile device to a low power state (e.g., reduced processor component 126 frequency, etc.) or a disabled state.

It may be appreciated that, in addition to visually presenting the one or more context sensitive recommendations on a display screen, any of the context sensitive recommendation information may also be automatic implemented by the mobile power application 124-1-1. For example, the mobile power application 124-1-1 may automatically terminate one or more non-predominant applications or automatically reduce the brightness of the display screen of the mobile device 102-1 during one or more contexts based at least partially on the one or more context sensitive recommendations during the respective contexts. The example is not limited in this context.

FIG. 3A illustrates exemplary embodiment of past power curve information 214-3. As illustrated in FIG. 3A, the past power curves 302-1, 302-2, 302-3 may be represented by past power curve information 214-3. Each past power curve (e.g., past power curve 302-1, 302-2, 302-3) may be representative of a power reserve vs time curve for a set time period or interval of time (e.g., 24 hours) starting at time T (e.g., 12:00 AM), and continuing until T+n (e.g., 11:59 PM). Moreover, the past power curves 302-1, 302-2, 302-3 may be representative of the power utilization starting at 12:00 AM for the past three Mondays in the past three weeks. It may be appreciated while only three past power curves 302-1, 302-2, 302-3 are illustrated, the past power curve information 214-3 may be representative of any number of past power curves as more device profile information and/or optionally user profile information 210-5 are received from mobile device 102-1. The past power curves 302-1, 302-2, 302-3 may also be associated with past contexts represented by past context information 214-1 such as, for example, past event contexts 304-1, 304-2, 304-3, respectively, indicating battery charge events regarding when the mobile device 102-1 was starting to be charged on Mondays.

FIG. 3B illustrates exemplary embodiment of past context information 214-1. As illustrated in FIG. 3B the past contexts 312-1, 312-2, 312-3 may be represented by past context information 214-1. Each set of past contexts may be representative of one or more past contexts (e.g., activities and/or locations, etc.) for a set time period or interval of time (e.g., 24 hours) starting at time T (12:00 AM), and continuing until T+n (e.g., 11:59 PM). Moreover, the set of past contexts 312-1, 312-2, 312-3 may be representative of the past device events, past locations, and/or past social events associated with the user of the device 102-1 and/or the mobile device 102-1, starting at time T (12:00 AM) for the past three Mondays in the past three weeks. It may be appreciated that while only three set of past contexts 302-1, 302-2, 302-3 are shown, the past context information 214-1 may be representative of any number of sets of past contexts past power curves as more device profile information and/or optionally user profile information 210-5 are received from mobile device 102-1 for each day of the one or more weeks. Each set of past contexts may also include, but is not limited to one or more past location contexts (e.g., location A, location B, location C, traveling from location A to location B, etc.) represented by past location context information, one or more past event contexts (e.g., home, work, meeting, battery charge event, etc.) represented by past event context information, and/or one or more past application contexts (not shown) corresponding to and/or associated with the one or more past location contexts and/or past event contexts.

As further illustrated in FIG. 3B, each past location context may have varying past location start time, past location context end time, past location context duration, and/or past location category (e.g., home, etc.). Similarly, each past event context may also have varying past event context start time, past event context end time, past event context duration, past event category (e.g., calendar event, etc.), and/or past event sub-category associated with each past event category (e.g., meeting, etc.).

It may be appreciated that in order to improve clarity and/or understanding of the operating environments, some past contexts, future contexts, and/or analytics contexts, (e.g., past, future, and/or analytics event contexts for battery charge event, battery discharge event, application install event, application update event, application uninstalled event, etc.) that typically span a duration of several minutes to several hours, may not be illustrated or if illustrated may have a short duration or without any duration.

FIG. 3C illustrates exemplary embodiment of analytics information (e.g., analytics context information 212-3 and analytics power curve information 212-2, etc.). As illustrated in FIG. 3C the analytics power curve 322 is represented by the analytics power curve information 212-2 and generated by the power analytics modeling component 114-2 based at least partially on past power curve information 214-3 representative of one or more past power curves (e.g., power curves 302-1, 302-2, 302-3). Additionally, the analytics contexts 326 represented by analytics context information 212-3 and generated based at least partially on one or more past contexts (e.g., past sets of contexts 312-1, 312-2, 312-3) represented by past context information 214-1. Furthermore, the analytics power curve 322 may be further associated with an analytics event context and in particular, analytics charge event context 324 representative of an estimated or forecasted time of when the battery 188 of mobile device 102-1 is likely to be charged by the user.

FIG. 3D illustrates a first exemplary operating environment 340 of predicted information and/or recommendation information for a particular day of the week (e.g., Monday) with the current time being T+13 (1:00 PM). As illustrated in operating environment 340 of FIG. 3D, the predicted contexts 341-1 represented by predicted context information 215-5 may be generated and/or may include one or more past contexts 342-1 represented by past context information 214-1 and/or one or more analytics contexts represented by analytics context information 212-3. Additionally, the predicted power curve 348-1 may be represented by predicted power curve information 212-4 may be generated based at least partially on at least a portion of the past power curve information 214-3 (e.g., representative of the past power curve shown in solid lines) and/or analytics power curve information 212-2 (e.g., representative of analytics power curve shown in dashed lines).

With continued reference to operating environment 340 of FIG. 3D, at least a portion of the past power curve (shown in solid lines) and represented by past power curve information 214-3 may substantially correspond to and/or be associated with one or more past contexts 342-1. The past power curve (shown in solid lines) may substantially correspond to one or more past contexts 342-1 and may be representative of the power utilization of mobile device 102-1 during various past contexts 342-1 starting from time T (12:00 AM) and ending at time T+13 (1:00 PM), which is also the current time. Further, as illustrated between time T+12 (12:00 PM) and T+13 (1:00 PM), the past power curve portion of the predicted power curve 348-1 indicates that the mobile device 102-1 substantially deviated (e.g., greater than or equal to approximately 10% deviation, etc.) from estimated or forecasted power utilization as represented by analytics power curve 322 during the same time period or interval, which may be a result of intensive use of mobile device 102-1 (e.g., intensive use of one or more applications 124-1-b and/or one or more components of mobile device 102-1, etc.).

With continued reference to operating environment 340 of FIG. 3D, at least a portion of the predicted power curve 348-1 may also include, but is not limited to, a translated version of the analytics power curve 322. The translated version of the analytics power curve 322 may substantially correspond to and/or be associated with the analytics contexts 345-1 and may represent estimated or forecasted power utilization of mobile device 102-1 during analytics contexts 345-1 starting from time T+12 (12:00 PM) and ending at time T+n for a typical Monday. It may be appreciated that because the past power curve (shown in solid lines) represents the past power utilization and the actual remaining power reserve of the mobile device 102-1 up to and including the time T+13 (1:00 PM), the analytics power curve 322 starting at time T+13 (1:00 PM) may be appropriately translated (in a linear and/or non-linear fashion) based at least partially on the remaining power reserve at time T+12 (12:00 PM). The translated analytics power curve (shown in dashed lines in predicted power curve 348-1) may represent the power utilization for the remaining power reserve of the mobile device 102-1 given the amount of power reserve remaining for use.

With continued reference to operating environment 340 of FIG. 3D, the power analytics prediction component 114-3 may generate the predicted contexts 341-1, which may be represented by the predicted context information 212-5, by replacing analytics contexts with past contexts 342-1 corresponding to a time period or interval starting from time T (12:00 AM) and ending at current time T+13 (1:00 PM).

The power analytics prediction component 114-3 may generate the predicted power curve 348-1 represented by predicted power curve information 212-4 by replacing the analytics power curve 322 represented by analytics power curve information 212-2 corresponding to the time period or interval starting at time T (12:00 AM) and ending at current time T+13 (1:00 PM). The power analytics prediction component 114-3 may also replace portions of the analytics power curve 322 starting at current time T+13 (1:00 PM), et and ending at time T+n with translated analytics power curve (shown in predicted power curve 348-1 as dashed lines). Effectively, the predicted power curve 348-1 may be representative of an estimated or forecasted power utilization of the mobile device 102-1 for this particular Monday based at least partially on the past power utilization between time T and current time T+13 (1:00 PM) for this particular Monday and estimated or predicted power utilization generated based at least partially on one or more past Monday's.

With continued reference to operating environment 340 of FIG. 3D and based at least partially on the predicted power curve 348-1, analytics charge event context 324, power reserve threshold limit 344, and/or predicted contexts 341-1, the power analytics prediction component 114-3 may determine the predicted power event information 212-7 which may include, but is not limited to, predicted threshold limit event 352-1 and predicted charge event 350-1. The predicted threshold limit event 352-1 may provide the estimated or forecasted time the power reserve for mobile device 102-1 will fall below a power reserve threshold limit 344 and predicted charge event 350-1 may provide estimated or forecasted time and power reserve the mobile device 102-1 will likely charged. When the estimated or forecasted time for the predicted threshold limit event 352-1 occurs substantially before (e.g., more than 5 minutes, 10 minutes, 15 minutes, etc.) the estimated or forecasted time for the predicted charge event 350-1, the power analytics prediction component 114-3 may generate and/or provide context sensitive recommendations represented by context sensitive recommendation information 212-6 for one or more context sensitive recommendation periods 346-1 and 346-2.

As illustrated in operating environment 340 of FIG. 3D, the context sensitive recommendation period 346-1 may substantially correspond to analytics location context for traveling from location B to location C. Similarly, the context sensitive recommendation period 346-2 may substantially correspond to analytics location context for work at Location C and analytics event context for a meeting.

The analytics location context for traveling may be associated with analytics application context (not shown), which may indicate that the predominant application executed during traveling is the location application 124-1-10 for providing GPS navigation. As such, the power analytics prediction component 114-3 may provide one or more context sensitive application recommendations to the mobile device 102-1 for context sensitive recommendation period 346-1 to reduce power utilization during the analytics location context for traveling (e.g. traveling from location B to location C). The one or more context sensitive application recommendations may include one or more context sensitive application recommendations, one or more context sensitive component recommendations, and/or one or more context sensitive power recommendations.

The one or more context sensitive application recommendations for context sensitive recommendation period 346-1 may include, but is not limited to, closing and/or terminating one or more non-predominant applications (e.g., applications not including location application 124-1-10, etc.), refrain from launching one or more processing component intensive applications (e.g., refrain from using entertainment application 124-1-7 such as Angry Birds®, etc.), configuring one or more predominant and/or non-predominant applications to a low power state (e.g., turning off push e-mail services for e-mail application 124-1-6 or turning off push notifications for social application 124-1-9 such as Facebook®, etc.)

The one or more context sensitive component recommendations for context sensitive recommendation period 346-1 may include, but is not limited to, configuring one or more components of the mobile device 102-1 not utilized by the predominant application (i.e., location application 124-1-10) to a low power state (e.g., reducing the brightness of the touch sensitive display component 182, etc.) or to a disabled power state (e.g., disabling image capture component 154, haptic component 172, acceleration component 180 which may not be utilized by the location application 124-1-10, etc.).

The one or more context sensitive power recommendations for context sensitive recommendation period 346-1 may include, but is not limited to, configuring the mobile device to a low power state (e.g., reducing processing component 126 operating frequency, etc.) However, it may be appreciated that power analytics prediction component 114-3 may not recommend the user to charge the mobile device 102-1 because it would in consistent with the analytics location context for traveling because the user may not have the opportunity to charge the battery 188 of the mobile device 102-1 while traveling.

Similarly, the power analytics prediction component 114-3 may also provide one or more context sensitive application recommendations (e.g., context sensitive application recommendations, context sensitive component recommendations, and/or context sensitive power recommendations, etc.) to the mobile device 102-1 for context sensitive recommendation period 346-2 to reduce power utilization during the analytics location context for meeting at work (e.g. meeting at work at location C). The associated analytics application contexts (not shown) may identify that the predominant application executed during the meeting is audio/video application 124-1-12 for recording audio and the predominant application executed during the location C for work is e-mail application 124-1-6 for sending and receiving e-mail.

The one or more context sensitive application recommendations for context sensitive recommendation period 346-2 may include, but is not limited to, closing and/or terminating one or more non-predominant applications (e.g., applications not including e-mail application 124-1-6 and audio/video application 124-1-12, etc.), refrain from launching one or more processing component intensive applications (e.g., refrain from using entertainment application 124-1-7 such as Angry Birds®, etc.), configuring one or more predominant and/or non-predominant applications to a low power state (e.g., turning off push e-mail services for e-mail application 124-1-6 or turning off push notifications for social application 124-1-9 such as Facebook®, etc.)

The one or more context sensitive component recommendations for context sensitive recommendation period 346-2 may include, but is not limited to, configuring one or more components of the mobile device 102-1 not utilized by the predominant applications (i.e., audio/video application 124-1-12 for recording audio and e-mail application 124-1-6 for sending and receiving e-mail) to a low power state (e.g., reducing the brightness of the touch sensitive display component 182, etc.) or to a disabled power state (e.g., disabling image capture component 154, haptic component 172, acceleration component 180, location component 176 which may not be utilized by audio/video application 124-1-12 and e-mail application 124-1-6, etc.).

The one or more context sensitive power recommendations for context sensitive recommendation period 346-2 may include, but is not limited to, configuring the mobile device to a low power state (e.g., reducing processing component 126 operating frequency, etc.) and to charge the mobile device 102-1.

FIG. 3E illustrates a second exemplary operating environment 360 of predicted information and/or recommendation information for a particular day of the week (e.g., Monday) with the current time being approximately T+8.5 (8:30 AM). As illustrated in operating environment 360 of FIG. 3E, the predicted contexts 341-2 represented by predicted context information 212-5 may be generated and/or may include one or more past contexts 342-2 represented by past context information 214-1, one or more future contexts 362-1, 362-2, 362-3 and/or one or more analytics contexts represented by analytics context information 212-3. Additionally, the predicted power curve 348-2 may be represented by predicted power curve information 212-4 may be generated based at least partially on at least a portion of the past power curve information 214-3 (e.g., representative of the past power curve shown in solid lines), future power curve information 214-4, and/or analytics power curve information 212-2 (e.g., representative of analytics power curve shown in dashed lines).

With continued reference to operating environment 360 of FIG. 3E, at least a portion of the predicted power curve 348-2 may include the past power curve (shown in solid lines) and represented by past power curve information 214-3. The past power curve may substantially correspond to and/or be associated with the past contexts 342-2 and may represent the power utilization of mobile device 102-1 during past contexts 342-2 from time T (12:00 AM) to current time T+8.5 (8:30 AM).

With continued reference to operating environment 360 of FIG. 3E, at least a portion of the predicted power curve 348-2 may also include, but is not limited to, a future power curve (shown in dot dashed lines) represented by future power curve information 214-4. The future power curve may substantially correspond to and/or be associated with one or more future contexts 362-1, 362-2, 362-3, represented by future context information 214-2. By way of example, the future contexts 362-2 may represent a future location context and a future event context. The future event context may correspond to a scheduled meeting at time T+9.5 (9:30 AM) and ending at time T+11 (11:00 AM) and the future location context may correspond to location D. The future context 362-1 may represent a future location context for traveling from at location A to location D and the future context 362-3 may represent a future location context for traveling from location D to work location B.

The future power curve (shown in dot dashed lines) corresponding to each future contexts 362-1, 362-2, 362-3 may represent estimated or predicted power utilization of the mobile device 102-1 during a typical meeting (e.g., meeting at location D) and typical traveling (e.g., traveling from location A to location D and traveling from location D to location B), which may be determined by the power analytics prediction component 114-3 based at least partially on future application context information and analytics model information 212-1 for each application that is estimated or forecasted to be executed during the future contexts 362-1, 362-2, 362-3. It may be appreciated that because the past power curve (shown in solid lines) represents the past power utilization and remaining power reserve of the mobile device 102-1 up to and including the current time (e.g., T+8.5 (8:30 AM), etc.), the future power curve may be appropriately translated (in a linear and/or non-linear fashion) based at least partially on the remaining power reserve at current time (e.g., T+8.5 (8:30 AM), etc.).

With continued reference to operating environment 360 of FIG. 3E, at least a portion of the predicted power curve 348-2 may also include, but is not limited to, a translated version of the analytics power curve 322. The translated version of the analytics power curve 322 may substantially correspond to and/or be associated with the analytics contexts 345-2 and may represent the power utilization of mobile device 102-1 during analytics contexts 345-2 from time T+12 (12:00 PM) and ending at time T+n. It may be appreciated that because the future power curve (shown in dot dashed lines) represents the future power utilization and estimated or forecasted remaining power reserve of the mobile device 102-1 up to and including the time T+12 (12:00 PM), the analytics power curve 322 starting at time T+12 (12:00 PM) may be appropriately translated (in a linear and/or non-linear fashion) based at least partially on the remaining power reserve at time T+12 (12:00 PM).

The power analytics prediction component 114-3 may generate the predicted contexts 341-2, which may be represented by the predicted context information 212-5, by replacing analytics contexts 345-2 starting at time T and ending at time T+n with future analytics contexts at the respective time periods or intervals (e.g., replacing analytics context between 9:30 AM and 11:00 AM with future contexts 362-2 for a scheduled meeting between 9:30 AM and 11 AM at location D). The power analytics prediction component 114-3 may also replace analytics contexts 345-2 and/or future contexts 362-1, 362-2, 362-3 (if any), starting at time T and ending at time T+n with past contexts 342-2 corresponding to a time period or interval from a past time to the current time (e.g., from T (12:00 AM) to time T+8.5 (8:30 AM), etc.). Additionally, based at least partially on one or more contexts (e.g., past context 342-2, and analytics contexts 345-2, and future contexts 362-2) that may be adjacent to the future contexts 362-1, 362-3, the power analytics prediction component 114-3 may further determine that the future context 362-1 may represent the future location context for traveling from at location A to location D and the future context 362-3 may represent a future location context for traveling from location D to work location B.

The power analytics prediction component 114-3 may generate the predicted power curve 348-1 represented by predicted power curve information 212-4 by replacing the analytics power curve 322 (shown in dashed lines) represented by analytics power curve information 212-2 starting at time T (12:00 AM) and ending at time T+8.5 (8:30 AM) with past power curve (shown in solid lines) represented by past power curve information 214-3 starting at time T (12:00 AM) up to the current time (e.g., T+8.5 (8:30 AM), etc.). The power analytics prediction component 114-3 may also replace portions of the analytics power curve 322 with future power curve (shown in dot dash lines) starting at current time (e.g., T+8.5 (8:30 AM), etc.) and ending at estimated or forecasted time (e.g., T+12 (12:00 PM), etc.) based at least partially on the approximate duration of future contexts 362-1, 362-2, 362-3. Furthermore, the power analytics prediction component 114-3 may also replace portions of the analytics power curve 322 starting at estimated or forecasted time (e.g., T+12 (12:00 PM), etc.) and ending at time T+n with translated analytics power curve (shown in predicted power curve 348-2 as dashed lines). Effectively, the predicted power curve 348-2 may be representative of an estimated or forecasted power utilization of the mobile device 102-1 for this particular Monday based at least partially on the past power utilization between time T and current time T+8.5 (8:30 AM) for this particular Monday, estimated or forecasted power utilization for a scheduled meeting starting at time T+9.5 (9:30 AM) and ending at time T+11 (11:00 AM) and traveling to and from the scheduled meeting at location D, and estimated or forecasted power utilization generated based at least partially on one or more past Monday's.

With continued reference to operating environment 360 of FIG. 3E and based at least partially on the predicted power curve 348-1, analytics charge event context 324, power reserve threshold limit 344, and/or predicted contexts 341-1, the power analytics prediction component 114-3 may determine the predicted power event information 212-7 which may include, but is not limited to, predicted threshold limit event 352-2 representative of the estimated or forested time and power reserve of the mobile device will fall below the power reserve threshold limit 344 and predicted charge event 350-2 representative of the estimated or forecasted time and power reserve the mobile device 102-1 will likely charged. When the estimated or forecasted time for the predicted threshold limit event 352-2 occurs substantially before (e.g., more than 5 minutes, 10 minutes, 15 minutes, etc.) the estimated or forecasted time for the predicted charge event 350-2, the power analytics prediction component 114-3 may generate and/or provide context sensitive recommendations (not shown) represented by context sensitive recommendation information 212-6 for one or more context sensitive recommendation periods 364-1, 364-2, 364-3, 364-4, 364-5 corresponding one or more future contexts 362-1, 362-2, 362-3 and on or more analytics contexts 345-2 during any time before the estimated or forecasted time associated with the predicted threshold limit event 352-2.

In the operating environment 360 of FIG. 3E, the context sensitive recommendation period 364-1 and 364-3 may substantially correspond to future location context for traveling from location A to location D and location D to location B (not shown). Similarly, the context sensitive recommendation period 364-5 may substantially correspond to analytics location context for traveling from location B to location C. Additionally, the context sensitive recommendation period 364-4 may substantially correspond to analytics location context for work at location B and the context sensitive recommendation period 364-2 may substantially correspond to future location context at location D and a future event context for a scheduled meeting between 9:30 AM and 11:00 AM (not shown).

Assuming that the predominant application estimated or forecasted to be executed during analytics location context and/or future location contexts for traveling between locations is the location application 124-1-10, the power analytics prediction component 114-3 may provide one or more context sensitive recommendations represented by context sensitive recommendation information 212-6 for future location contexts 362-1, 362-3 for traveling from location A to location D and traveling from location D to location B, and analytics location context for traveling from location B to location C. The one or more context sensitive recommendations may include context sensitive application recommendations (e.g., recommendation to close and/or terminate one or more non-predominant applications, etc.), context sensitive component recommendations (e.g., recommendation to configure one or more components of the mobile device 102-1, not utilized by the predominant application to a low power state or to a disabled power state, etc.), and context sensitive power recommendations (e.g., recommendation to configure the mobile device 102-1 to a low power state, etc.).

Similarly, assuming that the predominant applications estimated or forecasted to be executed during analytics location context for work at location B is the e-mail application 124-1-6 and the predominant application estimated or forecasted to be executed during future location context and future meeting context are the e-mail application 124-1-6 and the audio/video application 124-1-12. The one or more context sensitive recommendations for contexts may include context sensitive application recommendations (e.g., recommendation to close and/or terminate one or more non-predominant applications, etc.), context sensitive component recommendations (e.g., recommendation to configure one or more components of the mobile device 102-1, not utilized by the predominant application to a low power state or to a disabled power state, etc.), and context sensitive power recommendations (e.g., recommendation to configure the mobile device 102-1 to a low power state and charging the mobile device 102-1 etc.).

FIG. 3F illustrates a third exemplary operating environment 380 of predicted information and/or recommendation information for a particular day of the week (e.g., Monday) with the current time being approximately T+12 (12:00 PM). As illustrated in operating environment 380 of FIG. 3F, the predicted contexts 341-2 represented by predicted context information 212-5 may be generated and/or may include one or more past contexts 342-3 represented by past context information 214-1 and/or one or more analytics contexts represented by analytics context information 212-3. Additionally, the predicted power curve 348-3 may be represented by predicted power curve information 212-3 may be generated based at least partially on at least a portion of the past power curve information 214-3 (e.g., representative of the past power curve shown in solid lines), future power curve information 214-4 (e.g., representative of future power curve shown in dot dashed lines), and/or analytics power curve information 212-2 (e.g., representative of analytics power curve shown in dashed lines).

With continued reference to operating environment 380 of FIG. 3F, at least a portion of the predicted power curve 348-3 may include the past power curve (shown in solid lines) and represented by past power curve information 214-3. The past power curve may substantially correspond to and/or be associated with the past contexts 342-3 and may represent the power utilization of mobile device 102-1 during past contexts 342-3 from time T (12:00 AM) to current time T+12 (12:00 PM).

With continued reference to operating environment 380 of FIG. 3F, at least a portion of the predicted power curve 348-2 may also include, but is not limited to, a future power curve (shown in dot dashed lines) represented by future power curve information 214-4. The future power curve may substantially correspond to and/or be associated with device event 384, represented by device events information 210-3. By way of example, the device event 384 may represent a device application event such as device application install event for installation of an application (e.g., entertainment application 124-1-7 such as Angry Birds®).

The future power curve (shown in dot dashed lines) corresponding to device event 384 and analytics contexts 345-3 (e.g., analytic context for work at location B between time T+12 (12:00 PM) and time T+13 (1:00 PM)) may represent estimated or predicted power utilization of the mobile device 102-1 and duration of that power utilization after the device event 384, which may represent a device application event such as device application install event for installation of an application (e.g., installation of entertainment application 124-1-7 such as Angry Birds®). The future power curve corresponding to the device event 384 a may be determined by the power analytics prediction component 114-3 based at least partially on analytics information (e.g., analytics application context information of the analytics context information 212-3 corresponding to one or more device applications events, analytics model information 212-1) for mobile device 102-1. Additionally or alternatively, for any device events such as device application install event for installation of an application that has never been executed on the mobile device 102-1, the future power curve corresponding to the device event 384 may be determined by the power analytics prediction component 114-3 based at least partially on analytics information for other mobile devices as previously discussed with respect to FIG. 2. It may be appreciated that because the past power curve (shown in solid lines) represents the past power utilization and remaining power reserve of the mobile device 102-1 up to and including the current time (e.g., T+12 (12:00 PM), etc.), the future power curve corresponding to device event 384 may be appropriately translated (in a linear and/or non-linear fashion) based at least partially on the remaining power reserve at current time (e.g., T+12 (12:00 PM), etc.).

With continued reference to operating environment 380 of FIG. 3F, at least a portion of the predicted power curve 348-3 may also include, but is not limited to, a translated version of the analytics power curve 322. The translated version of the analytics power curve 322 may substantially correspond to and/or be associated with the analytics contexts 345-3 and may represent the power utilization of mobile device 102-1 during analytics contexts 345-3 from time T+13 (1:00 PM) and ending at time T+n. It may be appreciated that because the future power curve (shown in dot dashed lines) represents the future power utilization and estimated or forecasted remaining power reserve of the mobile device 102-1 up to and including the time T+13 (1:00 PM), the analytics power curve 322 starting at time T+13 (1:00 PM) may be appropriately translated (in a linear and/or non-linear fashion) based at least partially on the remaining power reserve at time T+13 (1:00 PM).

The power analytics prediction component 114-3 may generate the predicted contexts 341-3, which may be represented by the predicted context information 212-5, by replacing analytics contexts 345-3 starting at time T and ending at time T+n with past contexts 342-3 corresponding to a time period or interval from a past time to the current time (e.g., from T (12:00 AM) to time T+12 (12:00 PM), etc.).

The power analytics prediction component 114-3 may generate the predicted power curve 348-1 represented by predicted power curve information 212-4 by replacing the analytics power curve 322 (shown in dashed lines) represented by analytics power curve information 212-2 starting at time T (12:00 AM) and ending at the current time (e.g., T+12 (12:00 PM), etc.) with past power curve (shown in solid lines) represented by past power curve information 214-3 starting at time T (12:00 AM) up to the current time (e.g., T+12 (12:00 PM), etc.). The power analytics prediction component 114-3 may also replace portions of the analytics power curve 322 with future power curve (shown in dot dash lines) starting at current time (e.g., T+12 (12:00 PM), etc.) and ending at estimated or forecasted ending time (e.g., T+12 (1:00 PM), etc.)). Furthermore, the power analytics prediction component 114-3 may also replace portions of the analytics power curve 322 starting at estimated or forecasted time (e.g., T+13 (1:00 PM), etc.) and ending at time T+n with translated analytics power curve (shown in predicted power curve 348-2 as dashed lines) starting at the estimated or forecasted time and ending at time T+n. Effectively, the predicted power curve 348-3 may be representative of an estimated or forecasted power utilization of the mobile device 102-1 for this particular Monday based at least partially on the past power utilization between time T and current time T+12 (12:00 PM) for this particular Monday, estimated or forecasted power utilization for the mobile device 102-1 after a device event 384 occurs such as a device application install event for the installation of a new application (e.g., newly installed entertainment application 124-1-7 such as Angry Birds®, etc.), and estimated or forecasted power utilization generated based at least partially on one or more past Monday's.

With continued reference to operating environment 380 of FIG. 3F and based at least partially on the predicted power curve 348-3, analytics charge event context 34, power reserve threshold limit 344, and/or predicted contexts 341-3, the power analytics prediction component 114-3 may determine the predicted power event information 212-7 which may include, but is not limited to, predicted threshold limit event 352-3 representative of the estimated or forested time and power reserve of the mobile device will fall below the power reserve threshold limit 344 and predicted charge event 350-3 representative of estimated or forecasted time and power reserve the mobile device 102-1 will likely be charged. When the estimated or forecasted time for the predicted threshold limit event 352-3 occurs substantially before (e.g., more than 5 minutes, 10 minutes, 15 minutes, etc.) the estimated or forecasted time for the predicted charge event 350-3, the power analytics prediction component 114-3 may generate and/or provide context sensitive recommendations (not shown) represented by context sensitive recommendation information 212-6 for one or more context sensitive recommendation periods 381-1, 381-2, 381-3 corresponding one or more analytics contexts 345-3 during any time before the estimated or forecasted time associated with the predicted threshold limit event 352-3.

In the operating environment 380 of FIG. 3F, the context sensitive recommendation period 381-1 may substantially correspond to analytic location context for work at location B. Similarly, the context sensitive recommendation period 381-2 may substantially correspond to analytics location context for traveling from location B to location C. Additionally, the context sensitive recommendation period 382-3 may substantially correspond to analytics event context and analytics location context for a meeting at location C.

Assuming that the predominant application estimated or forecasted to be executed for context sensitive recommendation period 381-1 is the e-mail application 124-1-6, the power analytics prediction component 114-3 may provide one or more context sensitive recommendations represented by context sensitive recommendation information 212-6. The one or more context sensitive recommendations may include context sensitive application recommendations (e.g., recommendation to close and/or terminate one or more non-predominant applications, recommendation to refrain from launching the newly installed application, etc.), context sensitive component recommendations (e.g., recommendation to configure one or more components of the mobile device 102-1, not utilized by the predominant application to a low power state or to a disabled power state, etc.), and context sensitive power recommendations (e.g., recommendation to configure the mobile device 102-1 to a low power state or charge the mobile device, etc.).

Similarly, assuming that the predominant applications estimated or forecasted to be executed for context sensitive recommendation period 381-2 is the location application 124-1-10 and the predominant application estimated or forecasted to be executed for context sensitive recommendation period 381-2 are the e-mail application 124-1-6 and the audio/video application 124-1-12, the power analytics prediction component 114-3 may provide one or more context sensitive recommendations represented by context sensitive recommendation information 212-6. The one or more context sensitive recommendations for contexts may include context sensitive application recommendations (e.g., recommendation to close and/or terminate one or more non-predominant applications, etc.), context sensitive component recommendations (e.g., recommendation to configure one or more components of the mobile device 102-1, not utilized by the predominant application to a low power state or to a disabled power state, etc.), and context sensitive power recommendations (e.g., recommendation to configure the mobile device 102-1 to a low power state and charging the mobile device 102-1 etc.).

Figure 4A:
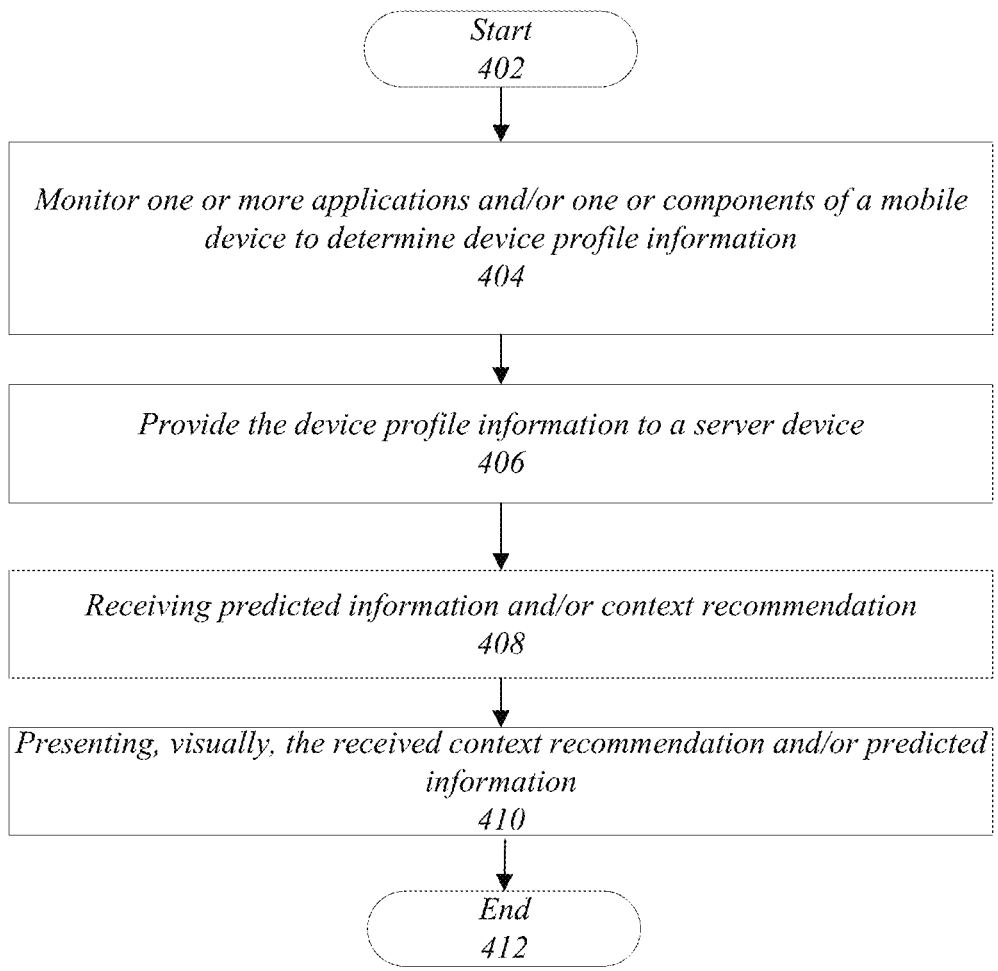
FIG. 4A illustrates one embodiment of a logic flow.

FIG. 4A illustrates one embodiment of a logic flow 400. The logic flow 400 may be representative of some or all of the operations executed by one or more embodiments described herein.

In the illustrated embodiment shown in FIG. 4A, the logic flow 400 may start at block 402 and may monitor one or more applications and/or one or more components of a mobile device to determine device profile information at step 404. For example, power application 124-1-1 via power monitoring component 190-3 may monitor one or more application and/or one or more components of the mobile device 102-1 by capturing and/or storing device application information 210-1, device component information 210-2, device event information 210-3, and/or device location information 210-4 to determine device profile information.

The logic flow 400 may provide the device profile information to a server device at 406. For example, power application 124-1-1 via power communications component 190-5 may provide the device profile information to power analytics application 109 executing on server device 106-2.

The logic flow 400 may receive predicted information and/or context information at 408. For example, the power management component 190-1 may receive predicted information (e.g., predicted power curve information 212-4, predicted context information 212-5, predicted power event information 212-7, etc.) and recommendation information (e.g. context sensitive recommendation information 212-6, etc.) from the power analytics application 109 of the power analysis system 105.

The logic flow 400 may present, visually, the received context recommendation and/or predicted information 410 and end at 412. For example, the power management component 190-1 may, via the power rendering component 190-2, visually present the one or more context sensitive recommendations (e.g., terminating one or more non-predominant applications, configuring one or more applications to a low power state, configuring one or more components to a low power state, charging the battery 188 of the mobile device, etc.) and/or one or more predicted power curves represented by predicted power curve information. The examples are not limited in this context.

Figure 4B:
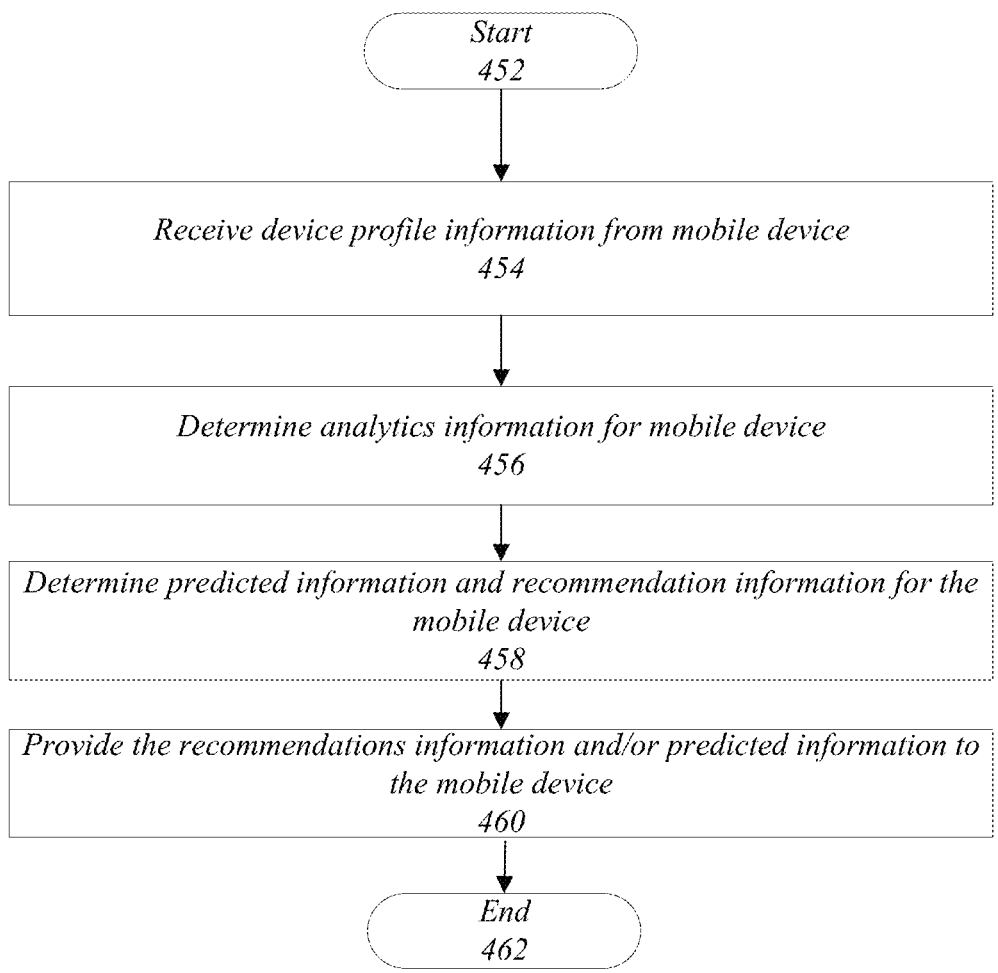
FIG. 4B illustrates another embodiment of a logic flow.

FIG. 4B illustrates one embodiment of a logic flow 450. The logic flow 450 may be representative of some or all of the operations executed by one or more embodiments described herein.

In the illustrated embodiment shown in FIG. 4B, the logic flow 450 may start at block 452 and receive device profile information from mobile device at 454. For example, the power analytics management component 114-1 of power analytics application 109 in the power analysis system may receive, periodically, the device profile information (e.g., device application information 210-1, device component information 210-2, device event information 210-3, and/or device location information 210-4, etc.) for mobile device 102-1.

The logic flow 450 may determine analytics information for mobile device at 456. For example, the power analytics management component 114-1 may initiate the determination of analytics information (e.g., analytics model information 212-1, analytics power curve information 212-2, analytics context information 212-3, etc.) by the power analytics modeling component 114-2 for mobile device 102-1.

The logic flow 450 may determine predicted information and recommendation information for the mobile device at 458. For example, the power analytics prediction component 114-3 may determine predicted information (e.g., predicted power curve information 212-4, predicted context information 212-5, predicted power event information 212-7, etc.) and recommendation information (e.g. context sensitive recommendation information 212-6, etc.) based at least partially on the analytics information and the device profile information.

The logic flow 450 may provide predicted information and/or the recommendation information to the mobile device 460 and end at 462. For example, the power analytics management component 114-1 may provide the predicted information (e.g., predicted power curve information 212-4, predicted context information 212-5, predicted power event information 212-7, etc.) and/or recommendation information (e.g. context sensitive recommendation information 212-6, etc.) via the power analytics communications component 114-4 to the mobile power application 124-1-1 of the mobile device 102-1. The examples are not limited in this context.

Figure 5:
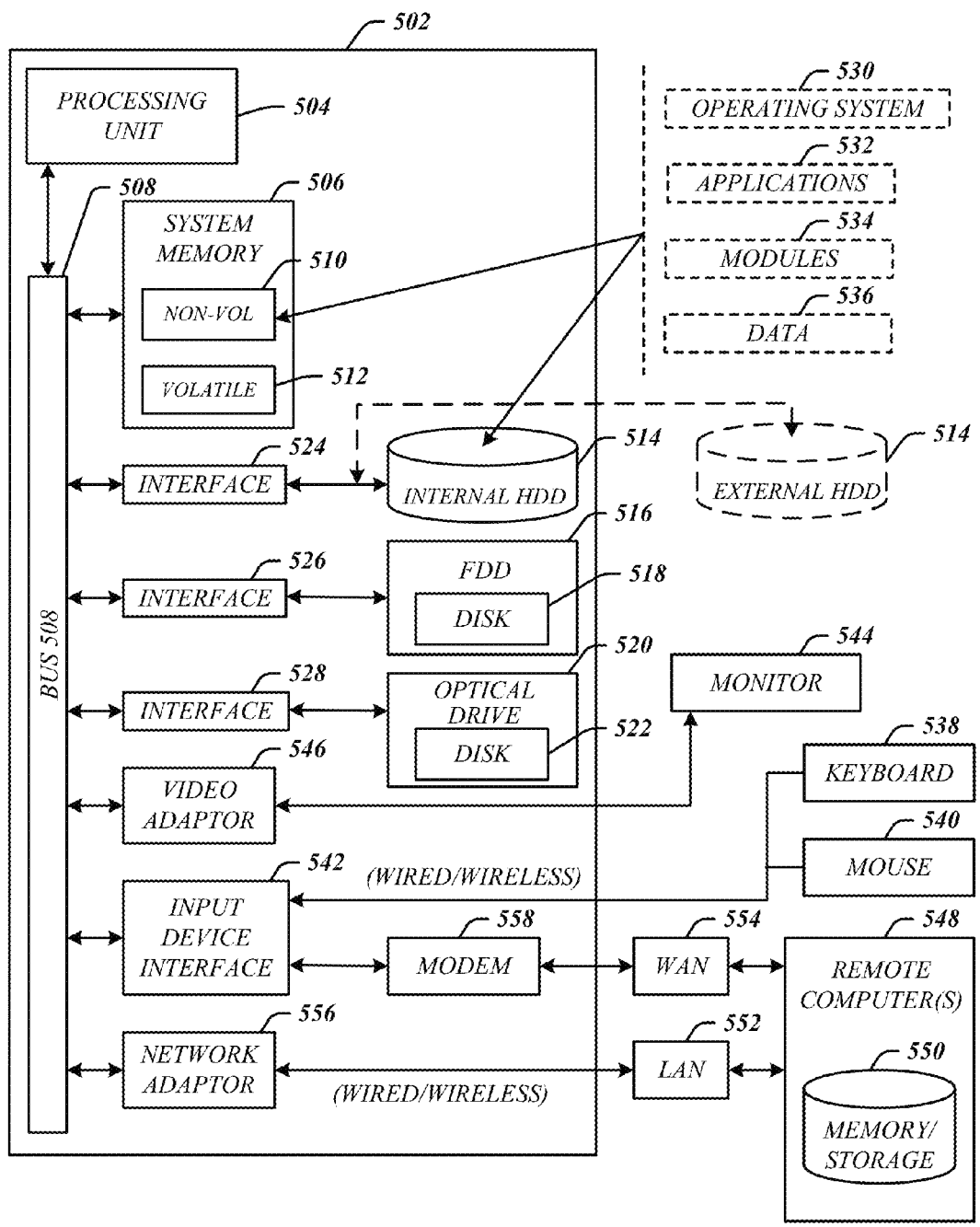
FIG. 5 illustrates an exemplary embodiment of a computing architecture.

FIG. 5 illustrates an embodiment of an exemplary computing architecture 500 suitable for implementing various embodiments as previously described, such as, for example server device 106 and/or one or more devices 102-a. In one embodiment, the computing architecture 500 may comprise or be implemented as part of an electronic device. In another embodiment, the computer architecture 500 may be implemented as part of a cloud computing platform as a physical machine or virtual machine in a network of one or more physical and/or virtual machines. The embodiments are not limited in this context.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in FIG. 5, the computing architecture 500 comprises a processing unit 504, a system memory 506 and a system bus 508. The processing unit 504 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 504.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 100.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms 'first,' "second," 'third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A non-transitory computer-readable storage medium comprising instructions that, when executed, cause a system to:
    receive device profile information determined by a mobile device;
    receive user profile information from a social networking system, the user profile information comprising user event information for a user having a user account in the social networking system and associated with the mobile device;

determine analytics information based at least partially on the received device profile information and the user event information, the analytics information comprising an analytics location context, an analytics event context, and power utilization information for one or more applications;

determine predicted information comprising:
- a forecasted list of applications identifying applications that may be executed during a future location context or during a future event context, the list generated by matching at least partially a future location context with the analytics location context or future event context with the analytics event context;
- a forecasted power utilization of the future location context or a future event context based at least in part on the power utilization information for the applications on the list of applications; and
- a first time of a predicted charge event and a second time when a power level of the mobile device will drop below a threshold based at least partially on the forecasted power utilization, the first time comprising a predicted time at which a power reserve of the mobile device will begin to increase;

determine that the first time occurs after the second time; and provide the predicted information to the mobile device in response to determining that the first time occurs after the second time.

2. The computer-readable storage medium of claim 1, wherein the predicted information further comprises predicted power curve information representative of a predicted power curve for estimating power utilization of the mobile device during a time period for a reoccurring day of the week.

3. The computer-readable storage medium of claim 2, wherein the predicted power curve information is determined by replacing at least a portion of the analytics power curve information with at least a portion of the past power curve information, future power curve information, and/or translated analytics power curve information.

4. The computer-readable storage medium of claim 1, the instructions further operative, when executed, to cause the system to:
- determine context sensitive recommendation information based at least partially on the determined analytics information; and
- provide the context sensitive recommendation information to the mobile device.

5. The computer-readable storage medium of claim 4, wherein the context sensitive recommendation information is determined based at least partially on at least one predicted context represented by predicted context information before a forecasted time associated with a predicted threshold limit event, the predicted threshold limit event indicating the forecasted time for a power reserve of the mobile device to fall below a predetermined threshold.

6. The computer-readable storage medium of claim 5, wherein the context information comprises future context information representative of one or more future contexts scheduled to occur, past context information representative of one or more past contexts that already occurred, and/or analytics context information representative of one or more forecasted analytics contexts that is likely to occur.

7. The computer-readable storage medium of claim 4, wherein context sensitive recommendation information comprises at least one context sensitive application recommendation to recommend terminating at least one non-predominant application executed during a predicted context.

8. A computer-implemented method comprising:
receiving device profile information determined by a mobile device at a server system;

receiving user profile information from a social networking system, the user profile information comprising user event information for a user having a user account in the social networking system and associated with the mobile device;

determining analytics information based at least partially on the received device profile information and the user event information at the server system, the analytics information comprising an analytics location context, an analytics event context, and power utilization information for one or more applications;

determining, at the server system, predicted information comprising:
- a forecasted list of applications identifying applications that may be executed during a future location context or during a future event context, the list generated by matching at least partially a future location context with the analytics location context or future event context with the analytics event context;
- a forecasted power utilization of the future location context or a future event context based at least in part on the power utilization information for the applications on the list of applications; and
- a first time of a predicted charge event and a second time when a power level of the mobile device will drop below a threshold based at least partially on the forecasted power utilization, the first time comprising a predicted time at which a power reserve of the mobile device will begin to increase;

determining that the first time occurs after the second time; and provide the predicted information to the mobile device in response to determining that the first time occurs after the second time.

9. The method of claim 8, wherein determining predicted information comprises determining predicted power curve information representative of a predicted power curve for estimating power utilization of the mobile device during a time period for a reoccurring day of the week.

10. The method of claim 9, comprising determining the predicted power curve information by replacing at least a portion of the analytics power curve information with at least a portion of the past power curve information, future power curve information, and/or translated analytics power curve information.

11. The method of claim 8, comprising:
- determining context sensitive recommendation information based at least partially on the determined analytics information; and
- providing the context sensitive recommendation information to the mobile device.

12. The method of claim 11, comprising determining the context sensitive recommendation information based at least partially on at least one predicted context represented by predicted context information before a forecasted time associated with a predicted threshold limit event, the predicted threshold limit event indicating the forecasted time for a power reserve of the mobile device to fall below a predetermined threshold.

13. The method of claim 11, wherein the context information comprises future context information representative of one or more future contexts scheduled to occur, past context information representative of one or more past contexts that already occurred, and/or analytics context information representative of one or more forecasted analytics contexts that is likely to occur.

14. The method of claim 11, wherein context sensitive recommendation information comprises at least one context sensitive application recommendation to recommend terminating at least one non-predominant application executed during a predicted context.

15. An apparatus, comprising:
a processor circuit;
memory operatively coupled to the processor circuit, the memory to store a power analytics application for execution by the processor circuit, the power analytics application comprising:
  a power analytics management component to receive device profile information determined by a mobile device and receive user profile information from a social networking system, the user profile information comprising user event information for a user having a user account in the social networking system and associated with the mobile device;
  a power analytics modeling component to determine analytics information based at least partially on the received device profile information and the user event information, the analytics information comprising an analytics location context, an analytics event context, and power utilization information for one or more applications; and
  a power analytics prediction component to determine predicted information comprising: a forecasted list of applications identifying applications that may be executed during a future location context or during a future event context, the list generated by matching at least partially a future location context with the analytics location context or future event context with the analytics event context, a forecasted power utilization of the future location context or a future event context based at least in part on the power utilization information for the applications on the list of applications, and a first time of a predicted charge event and a second time when a power level of the mobile device will drop below a threshold based at least partially on the forecasted power utilization, the first time comprising a predicted time at which a power reserve of the mobile device will begin to increase, the power analytics prediction component to determine that the first time occurs after the second time, and provide the predicted information to the mobile device in response to determining that the first time occurs after the second time.

16. The apparatus of claim 15, wherein the predicted information further comprises predicted power curve information representative of a predicted power curve for estimating power utilization of the mobile device during a time period for a reoccurring day of the week.

17. The apparatus of claim 16, wherein the predicted power curve information is determined by replacing at least a portion of the analytics power curve information with at least a portion of the past power curve information, future power curve information, and/or translated analytics power curve information.

18. The apparatus of claim 15, the power analytics prediction component further to determine context sensitive recommendation information based at least partially on the determined analytics information, and provide the context sensitive recommendation information to the mobile device.

19. The apparatus of claim 18, wherein the context sensitive recommendation information is determined based at least partially on at least one predicted context represented by predicted context information before a forecasted time associated with a predicted threshold limit event, the predicted threshold limit event indicating the forecasted time for a power reserve of the mobile device to fall below a predetermined threshold.

20. The apparatus of claim 18, wherein context sensitive recommendation information comprises at least one context sensitive application recommendation to recommend terminating at least one non-predominant application executed during a predicted context.

* * * * *